US011675238B2

(12) United States Patent
Wang et al.

(10) Patent No.: US 11,675,238 B2
(45) Date of Patent: Jun. 13, 2023

(54) DISPLAY PANEL, DISPLAY DEVICE AND METHOD OF DRIVING THE SAME

(71) Applicant: BOE TECHNOLOGY GROUP CO., LTD., Beijing (CN)

(72) Inventors: Qian Wang, Beijing (CN); Xue Dong, Beijing (CN); Qingxun Zhang, Beijing (CN); Xiaochuan Chen, Beijing (CN); Wenqing Zhao, Beijing (CN); Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 290 days.

(21) Appl. No.: 17/274,546

(22) PCT Filed: Jul. 16, 2020

(86) PCT No.: PCT/CN2020/102296
§ 371 (c)(1),
(2) Date: Mar. 9, 2021

(87) PCT Pub. No.: WO2021/008574
PCT Pub. Date: Jan. 21, 2021

(65) Prior Publication Data
US 2022/0050343 A1 Feb. 17, 2022

(30) Foreign Application Priority Data

Jul. 18, 2019 (CN) .......................... 201910652136.3

(51) Int. Cl.
*G02F 1/1335* (2006.01)
*G02F 1/1362* (2006.01)
(Continued)

(52) U.S. Cl.
CPC .... *G02F 1/136209* (2013.01); *G02F 1/13398* (2021.01); *G02F 1/133368* (2021.01);
(Continued)

(58) Field of Classification Search
CPC ......... G02F 1/133615; G02F 1/133616; G02F 1/133614; G02F 1/133617;
(Continued)

(56) References Cited

U.S. PATENT DOCUMENTS 9,134,562 B2    9/2015  Kim
11,347,090 B2 *  5/2022  Li ..................... G02F 1/133548
(Continued)

FOREIGN PATENT DOCUMENTS

CN    104656306    5/2015
CN    107942574    4/2018
(Continued)

OTHER PUBLICATIONS

PCT International Search Report (w/ English translation) for corresponding PCT Application No. PCT/US2020/102296, dated Sep. 28, 2020, 6 pages.
(Continued)

*Primary Examiner* — Paisley L Wilson
(74) *Attorney, Agent, or Firm* — Dority & Manning, PA

(57) ABSTRACT

A display panel includes: a first substrate and a second substrate; and a liquid crystal layer. The first substrate includes a first base, and a light extraction portion and a light conversion portion that are disposed on a first side and located in each sub-pixel region. The first base has the first side facing the second substrate. A refractive index of the light extraction portion is greater than or equal to a refractive index of the first base, and a refractive index of a portion of the light conversion portion in direct contact with the first base is less than the refractive index of the first base. The second substrate includes a second base, and at least one light reflecting structure and at least one light absorbing structure that are disposed at a side of the second base facing the first substrate and located in the sub-pixel region.

20 Claims, 14 Drawing Sheets

(51) Int. Cl.
*G09G 3/36* (2006.01)
*G02F 1/1339* (2006.01)
*G02F 1/1333* (2006.01)

(52) U.S. Cl.
CPC .. *G02F 1/133553* (2013.01); *G02F 1/133616* (2021.01); *G09G 3/3607* (2013.01); *G02F 1/133614* (2021.01)

(58) Field of Classification Search
CPC ......... G02F 1/133553; G02F 1/133512; G02F 1/136209; G02F 1/133368; G02F 1/133528
See application file for complete search history.

(56) References Cited

U.S. PATENT DOCUMENTS

| | | |
|---|---|---|
| 2019/0204708 A1 | 7/2019 | Wang |
| 2020/0257172 A1 | 8/2020 | Chen et al. |
| 2020/0292878 A1 | 9/2020 | Sekiguchi et al. |
| 2021/0141139 A1 | 5/2021 | Meng et al. |
| 2021/0215977 A1 | 7/2021 | Li |

FOREIGN PATENT DOCUMENTS

| | | | | |
|---|---|---|---|---|
| CN | 108398828 | | 8/2018 | |
| CN | 110262119 | | 9/2019 | |
| CN | 110673388 A | * | 1/2020 | |
| WO | WO-2005091060 A1 | * | 9/2005 | ............. G02B 6/005 |
| WO | WO2014204931 | | 12/2014 | |
| WO | WO2020052261 | | 3/2020 | |

OTHER PUBLICATIONS

Chinese First Office Action (w/ English translation) for corresponding CN Application No. 201910652136.3, 13 pages.

* cited by examiner

DISPLAY PANEL, DISPLAY DEVICE AND METHOD OF DRIVING THE SAME

CROSS-REFERENCE TO RELATED APPLICATIONS

This application is a national phase entry under 35 USC 371 of International Patent Application No. PCT/CN2020/102296, filed on Jul. 16, 2020, which claims priority to Chinese Patent Application No. 201910652136.3, filed on Jul. 18, 2019, which are incorporated herein by reference in their entirety.

TECHNICAL FIELD

The present disclosure relates to the field of display technologies, and in particular, to a display panel, a display device and a method of driving the same.

BACKGROUND

Currently, since liquid crystal displays (LCDs) have high display quality, a thin and light body, and a wide application range, they have been widely used in consumer electronic products such as mobile phones, notebook computers, desktop display devices, and televisions.

A conventional liquid crystal display (LCD) is configured such that liquid crystal molecules are filled in two parallel substrates, thin film transistors (TFTs) are provided in one of the two substrates, and a color film layer is provided in the other substrate. By controlling a deflection direction of liquid crystal molecules, a purpose of controlling whether polarized light of each pixel is emitted or not is achieved, thereby achieving a display purpose.

With the continuous progress of display technologies and users' increasing demand for display, LCDs are developing towards high pixels per inch (PPI), and high transmittance is also an important development trend.

SUMMARY

In one aspect, a display panel is provided. The display panel has a display region including a plurality of sub-pixel regions. The display panel includes: a first substrate and a second substrate that are oppositely arranged; and a liquid crystal layer disposed between the first substrate and the second substrate. The first substrate includes: a first base; and a light extraction portion and a light conversion portion that are disposed on a first side and located in each sub-pixel region. The first base has the first side facing the second substrate and a plurality of second sides intersecting the first side. A refractive index of the light extraction portion is greater than or equal to a refractive index of the first base, and a refractive index of a portion of the light conversion portion in direct contact with the first base is less than the refractive index of the first base. At least one second side is a light incident surface. The second substrate includes: a second base; and at least one light reflecting structure and at least one light absorbing structure that are disposed at a side of the second base facing the first substrate and located in the sub-pixel region. At least one side of a light reflecting structure is provided with a light absorbing structure. The light reflecting structure is configured to reflect light that exits from the light extraction portion, passes through the liquid crystal layer, and is incident onto the light reflecting structure, so that the reflected light passes through the first substrate to exit. The light absorbing structure is configured to absorb light that exits from the light extraction portion, passes through the liquid crystal layer, and is incident onto the light absorbing structure.

In some embodiments, a shape of an orthographic projection of the light extraction portion on the first base includes a stripe shape, a shape of an orthographic projection of the light reflecting structure on the first base includes a stripe shape, and a shape of an orthographic projection of the light absorbing structure on the first base includes a stripe shape. An extending direction of the light extraction portion, an extending direction of the light reflecting structure and an extending direction of the light absorbing structure are all parallel to the light incident surface.

In some embodiments, the light reflecting structure is in direct contact with the light absorbing structure, and an orthographic projection of the light absorbing structure on the first side of the first base is closer to or farther away from an orthographic projection of the light extraction portion on the first side of the first base than an orthographic projection of the light reflecting structure on the first side of the first base.

In some embodiments, the light extraction portion is in direct contact with the light conversion portion.

In some embodiments, the light conversion portion has a structure of at least one film. In a case where the light conversion portion has a structure of a single film, a refractive index of the light conversion portion is less than the refractive index of the first base, and the light conversion portion includes a primary color filter portion. In a case where the light conversion portion has a structure in which a plurality of films are stacked, the light conversion portion includes a first sub-layer and a second sub-layer that are arranged in a stack. The first sub-layer is disposed on the first side of the first base, the first sub-layer is made of a transparent material, and a refractive index of the first sub-layer is less than the refractive index of the first base. The second sub-layer is disposed on a surface of the first sub-layer away from the first base, and the second sub-layer includes a primary color filter portion.

In some embodiments, the light reflecting structure includes an inclined reflective surface, and the inclined reflective surface faces the light extraction portion. The inclined reflective surface and a surface of the second base facing the first base have an included angle therebetween, and the included angle is an acute angle. The inclined reflective surface is configured to reflect light that exits from the light extraction portion, passes through the liquid crystal layer, and is incident onto the inclined reflective surface, so that the reflected light passes through the first substrate to exit.

In some embodiments, the light reflecting structure includes a body, and the body is in a shape of a triangular prism. The body includes an inclined surface, a first prismatic surface and a second prismatic surface that are sequentially connected, the first prismatic surface faces the second base, and an included angle between the second prismatic surface and the first prismatic surface is greater than or equal to an included angle between light incident onto the light reflecting structure and the first prismatic surface. A material of the body includes a light reflecting material; the inclined surface is the inclined reflective surface. Or the body is made of an organic material; the light reflecting structure further includes a reflective layer disposed on the inclined surface, and the reflective layer includes the inclined reflective surface.

In some embodiments, the included angle between the inclined reflective surface and the surface of the second base facing the first base is in a range from 27° to 37°.

In some embodiments, in a thickness direction of the second base, a distance between an end of the inclined reflective surface proximate to the second base and an end of the inclined reflective surface away from the second base is in a range from 4.5 µm to 10.5 µm.

In some embodiments, the light absorbing structure includes a black matrix and/or a black spacer.

In some embodiments, in a case where the light absorbing structure includes the black matrix and the black spacer, the black spacer is located on a side of the black matrix away from the second base, and is in direct contact with the black matrix. A distance between an edge of the light reflecting structure proximate to the black spacer and an edge of the black spacer proximate to the light reflecting structure in a direction from the light incident surface pointing to a second side opposite to the light incident surface is greater than a distance between the edge of the light reflecting structure proximate to the black spacer and an edge of the black matrix proximate to the light reflecting structure in the direction from the light incident surface pointing to the second side opposite to the light incident surface.

In some embodiments, in a case where the light absorbing structure includes the black spacer, the first substrate further includes an opposite black spacer disposed at a side of the light conversion portion away from the first base, and an orthographic projection of the opposite black spacer on the first side of the first base is at least partially overlapped with an orthographic projection of the black spacer on the first side of the first base.

In some embodiments, the first substrate further includes a first orientation layer disposed at a side of both the light extraction portion and the light conversion portion proximate to the second substrate. The second substrate further includes a second orientation layer disposed on a side of both the light reflecting structure and the light absorbing structure proximate to the first substrate. Orientation directions of the first orientation layer and the second orientation layer are the same.

In some embodiments, the display panel further includes a polarizer disposed on the light incident surface.

In some embodiments, the first substrate further includes a first orientation layer disposed at a side of both the light extraction portion and the light conversion portion proximate to the second substrate. The second substrate further includes a second orientation layer disposed on a side of both the light reflecting structure and the light absorbing structure proximate to the first substrate. An extending direction of a transmission axis of the polarizer, an orientation direction of the first orientation layer and an orientation direction of the second orientation layer are the same.

In some embodiments, the display panel further includes a reflective sheet disposed on a second side opposite to the light incident surface in the plurality of second sides. The sub-pixel region includes a first sub-pixel sub-region and a second sub-pixel sub-region that is located on a side of the first sub-pixel sub-region and is adjacent to the first sub-pixel sub-region; the first sub-pixel sub-region and the second sub-pixel sub-region are arranged in a direction of the light incident surface pointing to the reflective sheet. Each of the first sub-pixel sub-region and the second sub-pixel sub-region is provided with a light reflecting structure and a light absorbing structure. The light reflecting structure in the first sub-pixel sub-region and the light reflecting structure in the second sub-pixel sub-region are symmetrical with respect to a joint line of the first sub-pixel sub-region and the second sub-pixel sub-region; the light absorbing structure in the first sub-pixel sub-region and the light absorbing structure in the second sub-pixel sub-region are symmetrical with respect to the joint line of the first sub-pixel sub-region and the second sub-pixel sub-region.

In some embodiments, the first substrate further includes a buffer layer disposed at a side of both the light extraction portion and the light conversion portion away from the first base. A thickness of the buffer layer is h, $$h \geq \frac{d}{2} \times \cot\theta;$$

d is a dimension of the light extraction portion in a direction of the light incident surface pointing to the reflective sheet, and θ is an included angle between light exiting from the light extraction portion and a normal line perpendicular to the first base.

In some embodiments, the first substrate further includes a common electrode disposed on a side of both the light extraction portion and the light conversion portion away from the first base. The second substrate further includes a pixel electrode disposed at a side of both the light reflecting structure and the light absorbing structure proximate to the second base and located in the sub-pixel region. The pixel electrode includes a plurality of strip-shaped sub-electrodes spaced apart from one another.

In another aspect, a display device is provided. The display device includes: the display panel as described in any of the above embodiments; and a backlight. The backlight is disposed at a side of the light incident surface in the display panel; the backlight is configured to emit collimated light, and to make the collimated light enter the first base of the display panel to propagate in the first base in a total reflection manner. An incident angle of the collimated light is δ, $$\delta \geq \arcsin\frac{n'}{n};$$

n is a refractive index of the first base, and n' is a refractive index of the portion of the light conversion portion of the display panel in direct contact with the first base. The collimated light includes collimated natural light, and the display panel further includes a polarizer disposed on the light incident surface.

In yet another aspect, a method of driving a display device is provided. The method is applied to the display device as described in any of the above embodiments. The method includes: driving the backlight in the display device to emit the collimated light; applying a common voltage to the first substrate of the display panel in the display device; and applying a driving voltage to the second substrate of the display panel for each sub-pixel region in the display panel, so as to control a deflection angle of liquid crystal molecules in the sub-pixel region in the liquid crystal layer of the display panel. According to a current gray scale state of the sub-pixel region, when the sub-pixel region is in a dark state, a value of the driving voltage is adjusted to control the deflection angle of the liquid crystal molecules, so that collimated light exiting from the light extraction portion of the display panel is incident onto the light absorbing structure of the display panel. When the sub-pixel region is in a bright state, the value of the driving voltage is adjusted to control the deflection angle of the liquid crystal molecules, so that the collimated light exiting from the light extraction portion is incident onto the light reflecting structure of the display panel. When the gray scale state of the sub-pixel region is between the dark state and the bright state, the value of the driving voltage is adjusted to control the deflection angle of the liquid crystal molecules, so that one part of the collimated light exiting from the light extraction portion is incident onto the light reflecting structure, and another part of the collimated light is incident onto the light absorbing structure.

BRIEF DESCRIPTION OF THE DRAWINGS

In order to describe technical solutions in the present disclosure more clearly, the accompanying drawings to be used in the description of some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual dimensions of products, actual processes of methods and actual timings of signals involved in the embodiments of the present disclosure.

DETAILED DESCRIPTION

Figure 1:
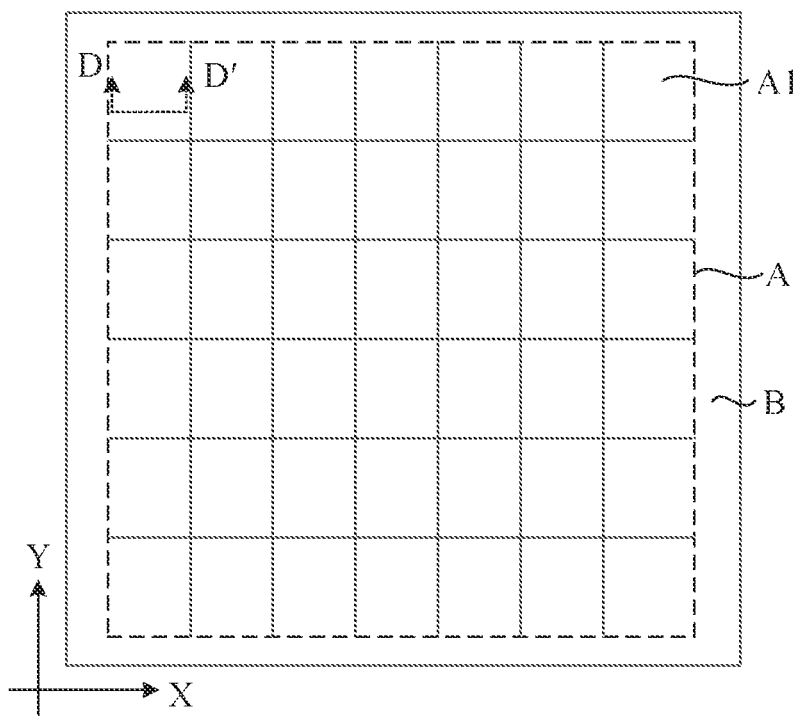
FIG. 1 is a top view of a display panel, in accordance with some embodiments of the present disclosure.

Technical solutions in some embodiments of the present disclosure will be described clearly and completely below with reference to accompanying drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, term "comprise" and other forms thereof such as the third-person singular form "comprises" and the present participle form "comprising" throughout the description and claims are construed as an open and inclusive meaning, i.e., "including, but not limited to". In description of the specification, terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Terms such as "first" and "second" are used for descriptive purposes only, and are not to be construed as indicating or implying the relative importance or implicitly indicating the number of indicated technical features below. Thus, features defined with "first" and "second" may explicitly or implicitly include one or more of the features. In the description of the embodiments of the present disclosure, term "a/the plurality of" means two or more unless otherwise specified.

In the description of some embodiments, term "connected" and its derivatives may be used. For example, the term "connected" may be used in the description of some embodiments to indicate that two or more components are in direct physical or electrical contact with each other. The embodiments disclosed herein are not necessarily limited to the contents herein.

The phrase "A and/or B" includes the following three combinations: only A, only B, and a combination of A and B.

As used herein, term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined" or "in response to determining" or "in a case where [the stated condition or event] is detected" or "in response to detecting [the stated condition or event]", depending on the context.

The phrase "applicable to" or "configured to" used herein means an open and inclusive expression, which does not exclude devices applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Term "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing techniques and/or tolerances may be envisaged. Therefore, the exemplary embodiments should not be construed as being limited to the shapes of regions shown herein, but include deviations in shapes due to, for example, manufacturing. For example, an etching region shown as a rectangle generally has a curved feature. Thus, the regions shown in the drawings are schematic in nature, and their shapes are not intended to illustrate actual shapes of the regions in a device and are not intended to limit the scope of the exemplary embodiments.

Figure 2A:
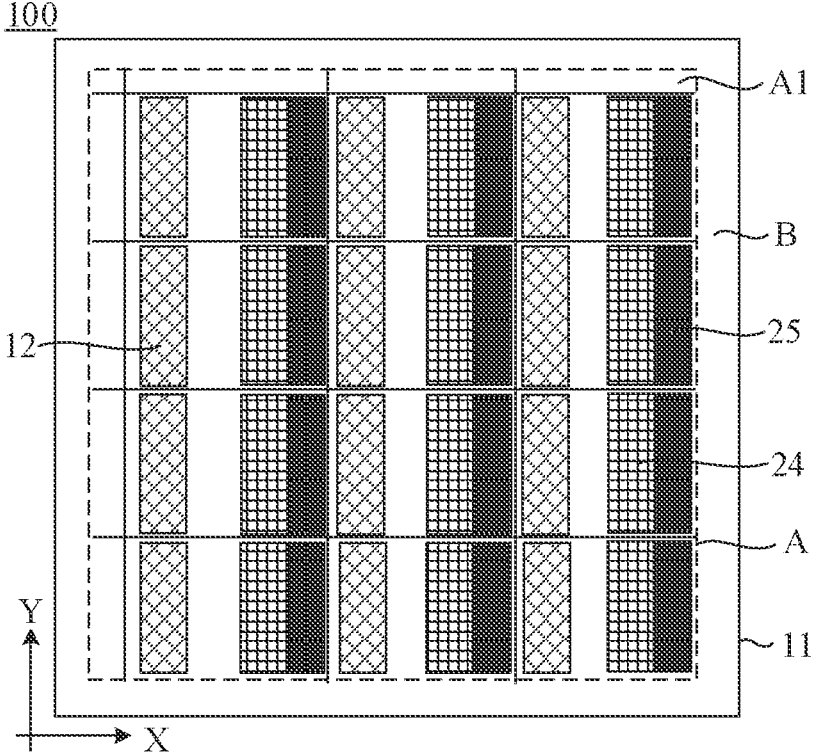
FIG. 2a is a top view of another display panel, in accordance with some embodiments of the present disclosure.
Figure 2B:
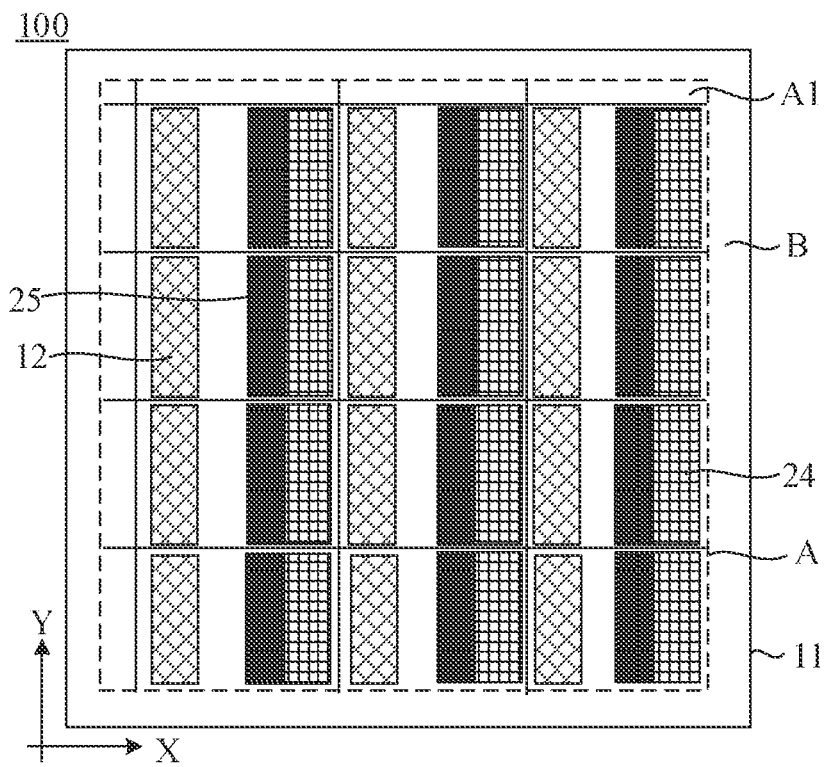
FIG. 2b is a top view of yet another display panel, in accordance with some embodiments of the present disclosure.

Some embodiments of the present disclosure provide a display panel 100. As shown in FIGS. 1 and 2, the display panel 100 has a display area A, and the display area A includes a plurality of sub-pixel regions A1. For example, the plurality of sub-pixel regions A1 may be arranged in an array.

In some examples, as shown in FIGS. 1 and 2, the display panel 100 also has a peripheral region B. The peripheral region B may be located on at least one side of the display area A. For example, as shown in FIGS. 1 and 2, the peripheral region B may be arranged around the display area A. Here, the peripheral region B may be used for wiring.

Figure 5:
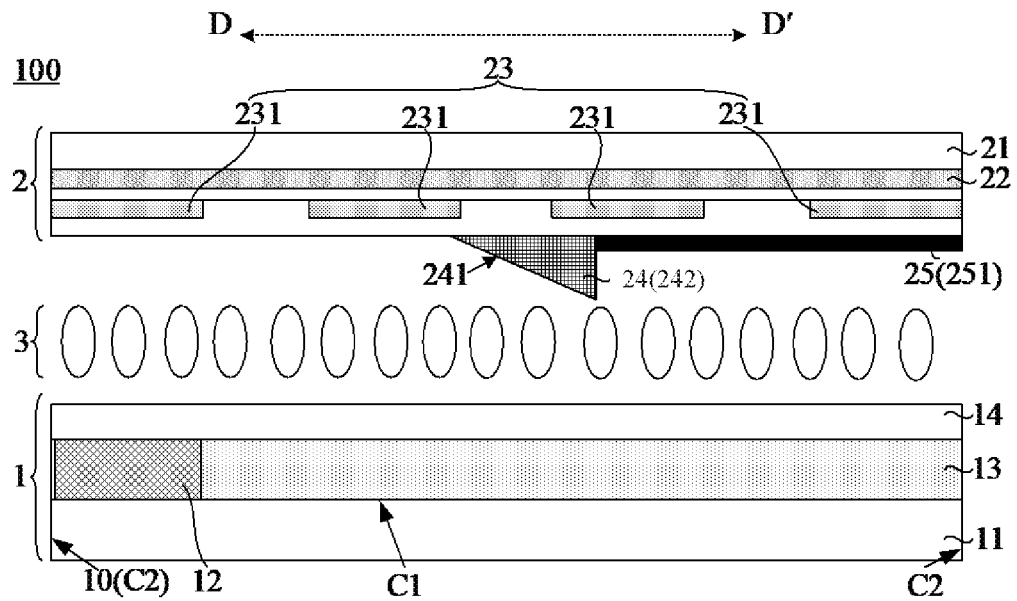
FIG. 5 is a sectional view of a display panel shown in FIG. 1 taken along the D-D' line.
Figure 6:
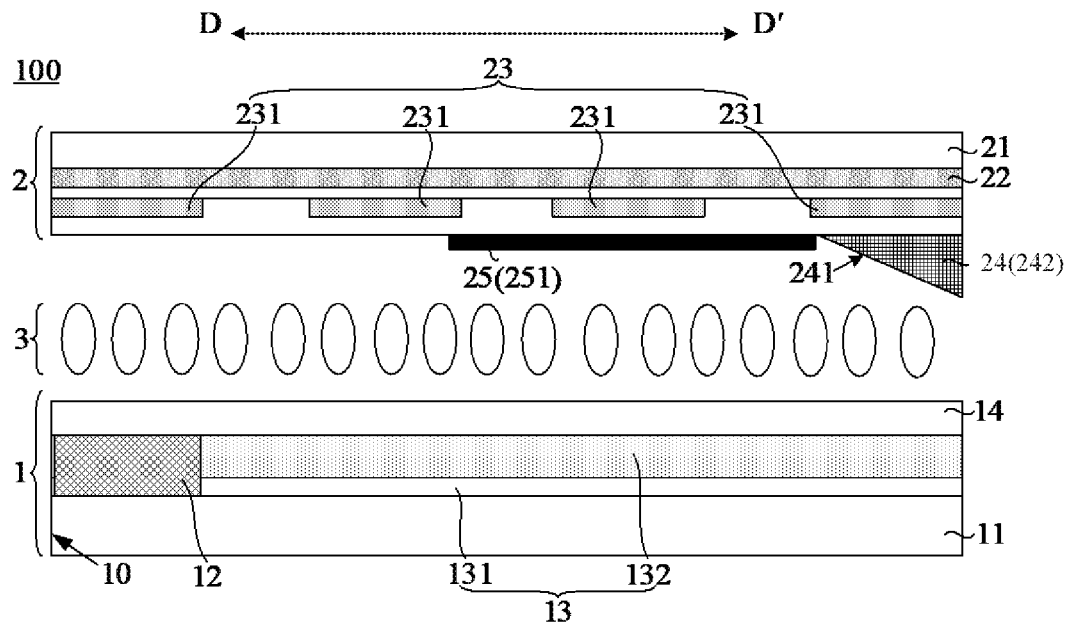
FIG. 6 is a sectional view of another display panel shown in FIG. 1 taken along the D-D' line.
Figure 7:
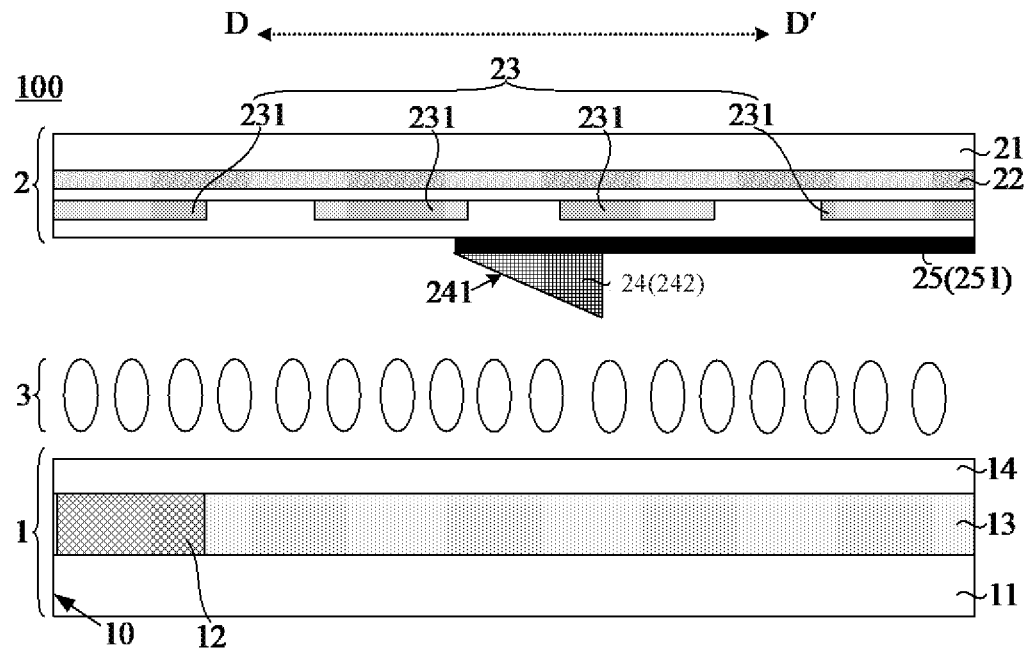
FIG. 7 is a sectional view of yet another display panel shown in FIG. 1 taken along the D-D' line.

In some embodiments, as shown in FIGS. 5 to 7, the display panel 100 includes: a first substrate 1 and a second substrate 2 that are oppositely arranged, and a liquid crystal layer 3 disposed between the first substrate 1 and the second substrate 2. There are a plurality of liquid crystal molecules in the liquid crystal layer 3. For example, the plurality of liquid crystal molecules may be positive liquid crystal molecules.

In some examples, as shown in FIGS. 5 to 7, the first substrate 1 includes a first base 11.

For example, the first base 11 may be a transparent light guide plate. The light guide plate may be, for example, a glass light guide plate.

A shape of the first base 11 is various, which may be selectively set according to actual needs. For example, the shape of the first base 11 is a rectangular parallelepiped.

The first base 11 has a plurality of sides. As shown in FIG. 5, the plurality of sides include, for example, a first side C1 facing the second substrate 2 and a plurality of second sides C2 intersecting the first surface C1. Here, the plurality of second sides C2 may be, for example, perpendicular to the first face C1.

For example, at least one second side C2 of the plurality of second sides C2 is a light incident surface 10. That is, light may enter the first base 11 through the at least one second side C2, and propagate inside the first base 11.

In a case where the shape of the first base 11 is the rectangular parallelepiped, the first base 11 has four second sides C2.

A structure of the display panel 100 will be schematically described below by taking an example in which the shape of the first base 11 is the rectangular parallelepiped and one of the four second sides C2 is the light incident surface 10.

In some examples, as shown in FIG. 5, the first substrate 1 further includes a light extraction portion 12 and a light conversion portion 13 that are disposed on the first side C1 of the first base 11 facing the second substrate 2 and are located in each sub-pixel region A1. The light extraction portion 12 is configured to extract light propagating in the first base 11. The light conversion portion 13 is configured such that after the light extracted by the light extraction portion 12 passes through the light conversion portion 13, a color of the transmitted light is changed. A color of light passing through each light conversion portion 13 is one of three primary colors. In a case where the three primary colors include red, green and blue, the one primary color is, for example, one of red, green and blue. Or, in a case where the three primary colors include magenta, yellow and cyan, the one primary color is, for example, one of magenta, yellow and cyan.

Here, the light extraction portion 12 and the light conversion portion 13 are disposed on the first side C1. That is, the light extraction portion 12 and the light conversion portion 13 are in direct contact with the first base 11, and no other film is provided between the light extraction portion 12 and the first base 11, and between the light conversion portion 13 and the first base 11.

In some examples, a refractive index of the light extraction portion 12 is greater than or equal to a refractive index of the first base 11, and a refractive index of a portion of the light conversion portion 13 in contact with the first base 11 is less than the refractive index of the first base 11.

It will be noted that, in a process of incident light from an optically denser medium (i.e., a medium with a higher refractive index) traveling into an optically thinner medium (i.e., a medium with a lower refractive index), if an incident angle is greater than or equal to a certain critical angle, the incident light is totally reflected and does not enter the optically thinner medium, but only propagates in the optically denser medium.

Based on this, in a case where n is expressed as the refractive index of the first base 11, n' is expressed as the refractive index of the portion of the light conversion portion 13 in contact with the first base 11, and β is expressed as a critical angle between the first base 11 and the portion of the light conversion portion 13 in contact with the first base 11, $$\beta = \arcsin\frac{n'}{n}.$$

Figure 8A:
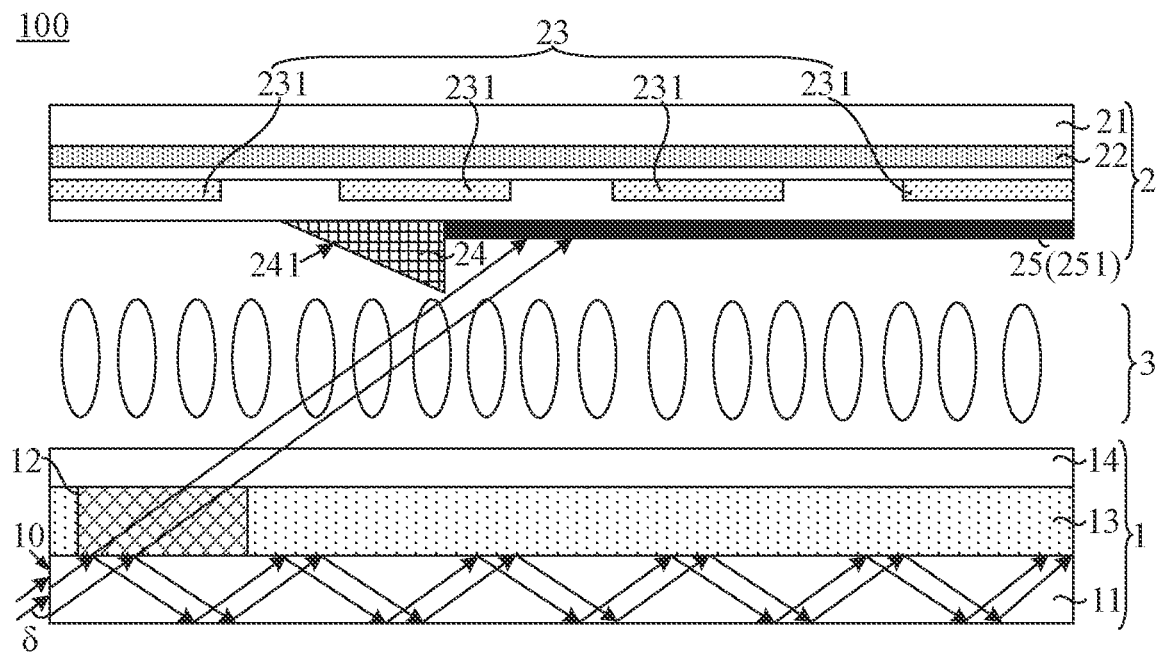
FIG. 8a is an optical path diagram of the display panel shown in FIG. 5.

Here, as shown in FIG. 8a, δ is expressed as an incident angle of the incident light incident onto the first base 11. Since the light conversion portion 13 is in direct contact with the first base 11, and the refractive index of the portion of the light conversion portion 13 in contact with the first base 11 is less than the refractive index of the first base 11, in a case where the incident angle δ of the incident light incident onto the first base 11 satisfies $$\delta \geq \beta \text{ (i.e., } \delta \geq \arcsin\frac{n'}{n}\text{),}$$

the incident light incident onto a contact surface of the light conversion portion 13 and the first base 11 may be totally reflected back into the first base 11 to propagate in the first base 11 in a total reflection manner without entering the light conversion portion 13.

For example, the refractive index n of the first base 11 is 1.5, and the refractive index n' of the portion of the light conversion portion 13 in contact with the first base 11 is 1.25. In this case, the critical angle β between the first base 11 and the portion of the light conversion portion 13 in contact with the first base 11 is 56.4°.

Based on this, the incident light may be incident onto the first base 11 at any angle greater than or equal to 56.4°. For example, δ may be any value in a range from 57° to 80°, for example, δ=65°.

On this basis, since the light extraction portion 12 is also in direct contact with the first base 11, and the refractive index of the light extraction portion 12 is greater than or equal to the refractive index of the first base 11, in a case where the incident light in the first base 11 is incident onto a contact surface between the light extraction portion 12 and the first base 11, the incident light passes through the light extraction portion 12 and travels toward the liquid crystal layer 3 since a total reflection condition is not satisfied.

For example, the refractive index of the light extraction portion 12 is the same as the refractive index of the first base 11.

For example, if the refractive index n of the first base 11 is 1.5, the refractive index of the light extraction portion 12 is 1.5.

By setting the refractive index of the light extraction portion 12 to be the same as the refractive index of the first base 11, an angle at which light emitted from the light extraction portion 12 is incident onto the liquid crystal layer 3 may be still an incident angle at which the light travels inside the first base 11, which is conducive to simplifying calculation difficulty in a subsequent process of determining positions of a light reflecting structure 24 and a light absorbing structure 25 in the second substrate 2. With respect to the light reflecting structure 24 and the light absorbing structure 25, reference may be made to the following description.

In some examples, as shown in FIGS. 5 to 7, the first substrate 1 further includes common electrode(s) 14 disposed on a side of both the light extraction portion 12 and the light conversion portion 13 away from the first base 11.

A structure of the common electrode 14 is various, which may be selectively set according to actual needs. For example, one common electrode 14 is provided in each sub-pixel region A1. For another example, the common electrode 14 is planar and covers the display area A.

A material of the common electrode 14 is various, which may be selectively set according to actual needs. For example, the common electrode 14 may be made of a conductive material with a high light transmittance. For example, the common electrode 14 may be made of indium tin oxide (ITO), indium zinc oxide (IZO), indium gallium zinc oxide (IGZO), or the like.

In this way, it is possible to prevent the common electrode 14 from adversely affecting the light emitted from the first substrate 1, thereby avoid affecting light transmittance of the display panel 100.

In some examples, as shown in FIGS. 5 to 7, the second substrate 2 includes a second base 21.

A category of the second base 21 is various, which may be selectively set according to actual needs.

For example, the second base 21 may be a blank base. For another example, the second base 21 may include a blank base and a functional film (the functional film may be, for example, an insulating layer) disposed on a side of the blank base.

A category of the blank base is various, which may be selectively set according to actual needs. For example, the blank base may be a polymethyl methacrylate (PMMA) base or a glass base.

Figure 4:
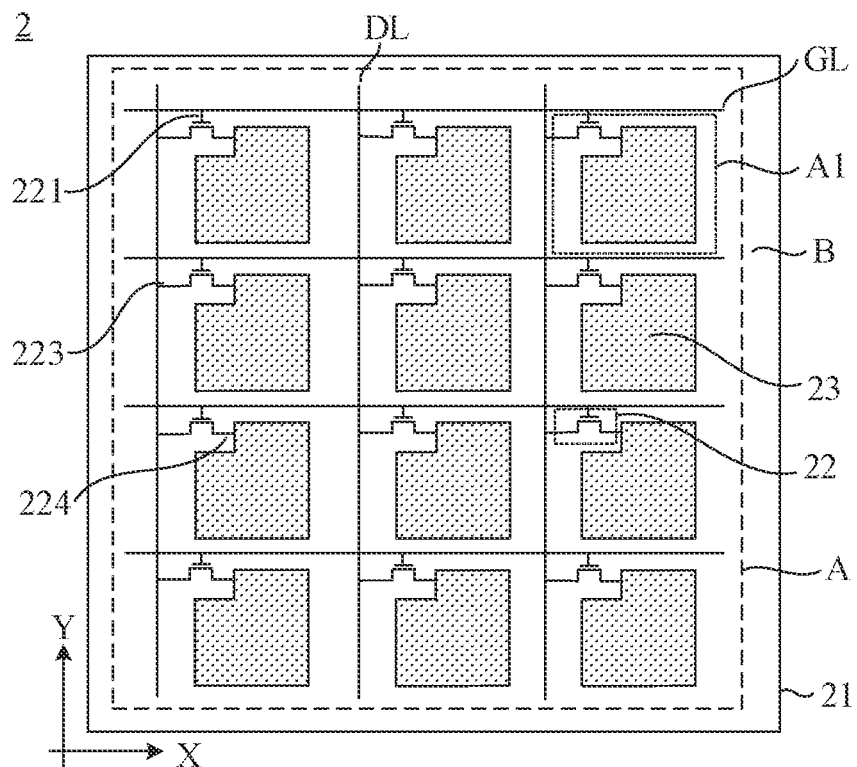
FIG. 4 is a top view of a second substrate, in accordance with some embodiments of the present disclosure.

In some examples, as shown in FIG. 4, the second substrate 2 further includes a plurality of gate lines GL and a plurality of data lines DL that are disposed on a side of the second base 21 proximate to the first substrate 1 and located in the display area A. The plurality of gate lines GL extend in a first direction X, and the plurality of data lines DL extend in a second direction Y.

The plurality of gate lines GL and the plurality of data lines DL cross each other and are insulated from each other, and define the plurality of sub-pixel regions A1.

In some examples, as shown in FIG. 4, the second substrate 2 further includes at least one transistor 22 (e.g., at least one thin film transistor) disposed in each sub-pixel region A1. The transistor 22 includes a gate 221, an active layer, a source 223 and a drain 224.

For example, sub-pixel regions A1 arranged in a row in the first direction X may be referred to as a same row of sub-pixel regions A1, and sub-pixel regions A1 arranged in a row in the second direction Y may be referred to as a same column of sub-pixel regions A1. Transistors 22 in the same row of sub-pixel region A1 may be, for example, electrically connected to one gate line GL, and transistors 22 in the same column of sub-pixel region A1 may be electrically connected to one data line DL. Each transistor 22 may be electrically connected to a corresponding gate line GL through its gate 221, and electrically connected to a corresponding data line DL through one (e.g., its source 223) of its source 223 and its drain 224.

A structure of the transistor 22 is various, which may be selectively set according to actual needs. For example, the transistor 22 may be a top-gate transistor (that is, the gate 221 is located at a side of the active layer away from the second base 21). For another example, the transistor 22 may be a bottom-gate transistor (that is, the gate 221 is located at a side of the active layer proximate to the second base 21).

In some examples, as shown in FIGS. 4 to 7, the second substrate 2 further includes a pixel electrode 23 disposed at a side of the at least one transistor 22 away from the second base 21 and located in each sub-pixel region A1.

Here, in a case where the transistor(s) 22 in each sub-pixel region A1 are turned on, they may transmit a driving voltage on the data line DL to the pixel electrode 23.

By applying a common voltage to the common electrode 14 in the first substrate 1 and applying a driving voltage to the pixel electrode 23, an electric field may be generated between the common electrode 14 and the pixel electrode 23. The liquid crystal molecules in the liquid crystal layer 3 may be rotated under action of the electric field. Thus, a deflection angle of the liquid crystal molecules may be controlled by adjusting a value of the driving voltage, and further a refractive index of the liquid crystal layer 3 may be adjusted.

Figure 10:
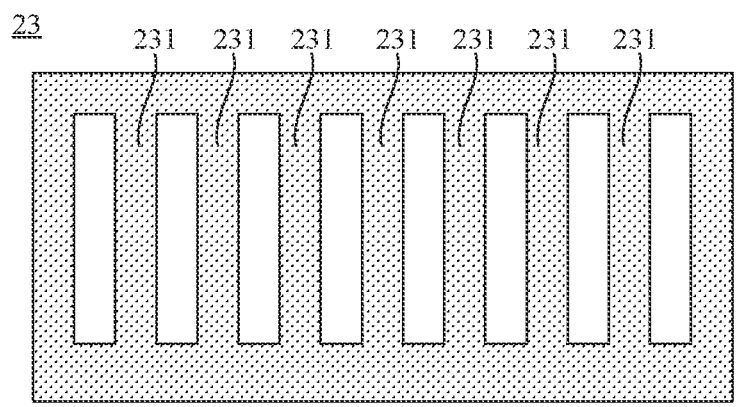
FIG. 10 is a structural diagram of a pixel electrode, in accordance with some embodiments of the present disclosure.

A structure of the pixel electrode 23 is various. For example, as shown in FIG. 10, each pixel electrode 23 includes a plurality of strip-shaped sub-electrodes 231 spaced apart from one another. Here, every two adjacent strip-shaped sub-electrodes 231 of the plurality of strip-shaped sub-electrodes 231 are insulated from each other; or as shown in FIG. 10, the plurality of strip-shaped sub-electrodes 231 spaced apart from one another may be electrically connected, so that the number of transistors 22 may be reduced.

In some examples, as shown in FIGS. 5 to 7, the second substrate 2 further includes at least one light reflecting structure 24 and at least one light absorbing structure 25 that are disposed at a side of the second base 21 facing the first substrate 1 and located in each sub-pixel region A1. At least one side of the light reflecting structure 24 is provided with a light absorbing structure 25.

A positional relationship of the light reflecting structure 24, the light absorbing structure 25 and the pixel electrode 23 is various, which may be selectively set according to actual needs.

For example, as shown in FIGS. 5 to 7, the pixel electrode 23 may be disposed at a side of both the light reflecting structure 24 and the light absorbing structure 25 proximate to the second base 21 in a same sub-pixel region A1. Of course, some embodiments of the present disclosure are not limited thereto, and the pixel electrode 23 may also be disposed on a side of both the light reflecting structures 24 and the light absorbing structures 25 away from the second base 21 in the same sub-pixel region A1.

For example, the number of the light reflecting structures 24 may be equal to the number of the light absorbing structures 25 in the same sub-pixel region A1. For example, in a case where one light reflecting structure 24 is provided in each sub-pixel region A1, one light absorbing structure 25 is provided in the sub-pixel region A1. For another example, in a case where two light reflecting structures 24 are provided in each sub-pixel region A1, two light absorbing structures 25 are provided in the sub-pixel region A1.

In some examples, the light reflecting structure 24 is configured to reflect light that exits from the light extraction portion 12, passes through the liquid crystal layer 3, and is incident onto the light reflecting structure 24, so that the reflected light passes through the first substrate 1 to exit. The light absorbing structure 25 is configured to absorb light that exits from the light extraction portion 12, passes through the liquid crystal layer 3, and is incident onto the light absorbing structure 25.

It will be noted that, after the light reflecting structure(s) 24 in each sub-pixel region A1 reflect light, the reflected light is still emitted from the sub-pixel region A1 where the light reflecting structure(s) 24 are located.

For example, as shown in FIGS. 8a to 8c and 9a to 9c, a display principle of the display panel 100 will be schematically described below by taking an example in which a gray scale range displayed by the display panel 100 is from L0 to L255.

The incident light propagates inside the first base 11 in a total reflection manner after entering the first base 11. In a propagation process of the incident light, if the incident light is incident onto the contact surface between the light extraction portion 12 and the first base 11, total reflection will be broken, and the incident light exits from the light extraction portion 12 and travels toward the liquid crystal layer 3. If a deflection angle of the liquid crystal molecules in the liquid crystal layer 3 is different, a refractive index of the liquid crystal layer 3 will be different, and a deflection degree of the incident light will be different after the incident light passes through the liquid crystal layer 3.

If all the incident light is incident onto the light absorbing structure 25 under the action of the liquid crystal molecules, the incident light is absorbed by the light absorbing structure 25, so that the gray scale displayed by the display panel 100 is L0 (that is, the display state is a dark state).

If one part of the incident light is incident onto the light absorbing structure 25 and another part of the incident light is incident onto the light reflecting structure 24 under the action of the liquid crystal molecules, the one part of the incident light incident onto the light absorbing structure 25 is absorbed by the light absorbing structure 25, and the another part of the incident light incident onto the light reflecting structure 24 is reflected by the light reflecting structure 24 toward the first substrate 1, and then passes through the light conversion portion 13 and the first base 11 in the first substrate 1 to exit. In this case, a gray scale displayed by the display panel 100 is any gray scale from L1 to L254.

If all the incident light is incident onto the light reflecting structure 24 under the action of the liquid crystal molecules, the incident light is totally reflected by the light reflecting structure 24 toward the first substrate 1, and then passes through the light conversion portion 13 and the first base 11 in the first substrate 1 to exit. In this case, a gray scale displayed by the display panel 100 is L255 (that is, the display state is a bright state).

In the display panel 100 provided by some embodiments of the present disclosure, the light entering the first base 11 from the light incident surface 10 of the first base 11 propagates inside the first base 11 in a total reflection manner. On this basis, the light is extracted only at a position of the light extraction portion 12 of each sub-pixel region A1, passes through the liquid crystal layer 3, and travels toward the light reflecting structure 24 and/or the light absorbing structure 25 of the second substrate 2. Therefore, the display panel 100 may achieve gray scale display in different states.

On this basis, after light is incident onto the light reflecting structure 24 in the second substrate 2, since the reflected light is finally emitted from the first substrate 1, and transistors 22 and relevant wires (e.g., including the gate lines GL and the data lines DL) are not provided in the first substrate 1, the reflected light is not blocked by the transistors 22 and the relevant wires. Therefore, the display panel 100 provided by some embodiments of the present disclosure may have a higher light utilization rate and a higher light transmittance.

In addition, it has been verified that a light efficiency of the first base 11 in the display panel 100 provided by some embodiments of the present disclosure may reach approximately 85%. Moreover, a light transmittance of the display panel 100 provided by some embodiments of the present disclosure may reach approximately 25%. As can be seen from the data, the display panel 100 provided by some embodiments of the present disclosure may effectively improve the utilization rate and transmittance of light.

It will be noted that the light entering the first base 11 is polarized light with a single polarization direction.

Figure 14:
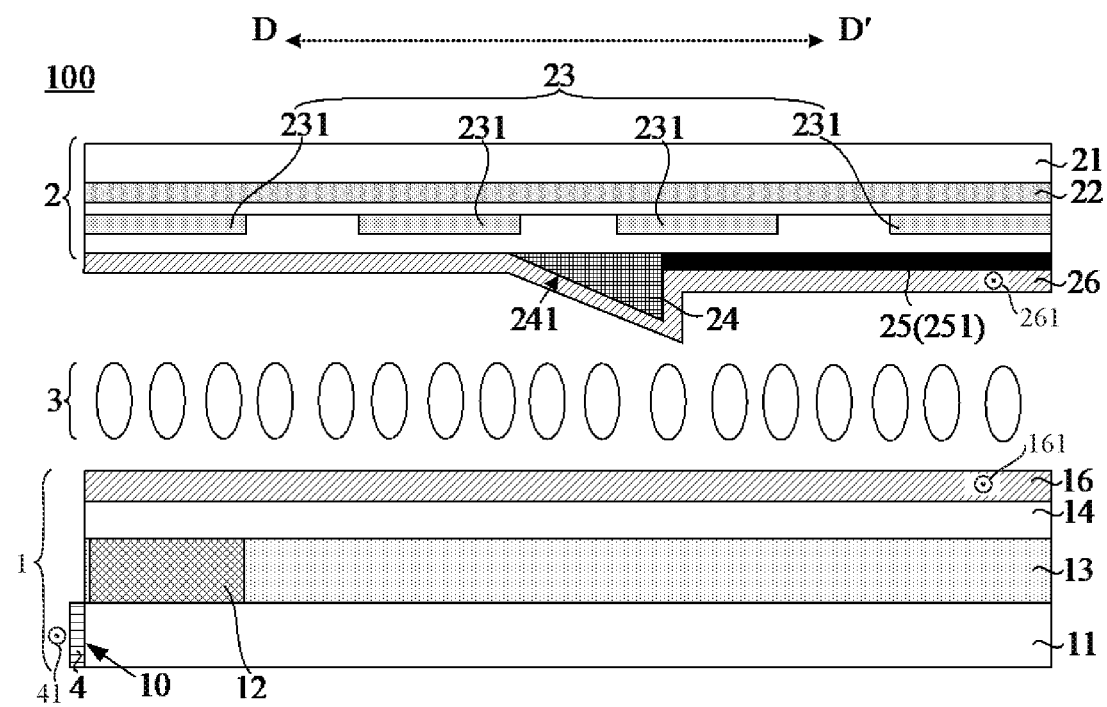
FIG. 14 is a sectional view of yet another display panel shown in FIG. 1 taken along the D-D' line.

Based on this, in some embodiments, as shown in FIG. 14, the display panel 100 further includes a polarizer 4 disposed on the light incident surface 10 of the first base 11.

In this case, after light passes through the polarizer 4, the polarized light emitted from the polarizer 4 is polarized light parallel to an extending direction of a transmission axis of the polarizer 4 (which may be referred to as s-component), and polarized light perpendicular to the extending direction of the transmission axis (which may be referred to as p-component) is absorbed.

By providing the polarizer 4, it may be ensured that the light entering the first base 11 is the polarized light. Of course, in a case where the display panel 100 does not include the polarizer 4, the light traveling toward the first base 11 may be the polarized light, which is conducive to simplifying the structure of the display panel 100.

In some embodiments, as shown in FIG. 2, a shape of an orthographic projection of the light extraction portion 12 on the first base 11 includes a strip shape, a shape of an orthographic projection of the light reflecting structure 24 on the first base 11 includes a strip shape, and a shape of an orthographic projection of the light absorbing structure 25 on the first base 11 includes a strip shape. An extending direction of the light extraction portion 12, an extending direction of the light reflecting structure 24 and an extending direction of the light absorbing structure 25 are all parallel to the light incident surface 10. Based on this, the polarized light entering the first base 11 may be collimated polarized light.

In this way, in a process in which the collimated polarized light in the first base 11 is extracted by the light extraction portion 12 and is directed to the light reflecting structure 24 and/or the light absorbing structure 25, it may be ensured that the collimated polarized light may be directed to the light reflecting structure 24 and/or the light absorbing structure 25 instead of being directed to a position other than the light reflecting structure 24 and/or the light absorbing structure 25. Therefore, a display effect of the display panel 100 may be prevented from being influenced.

Here, a positional relationship of the light extraction portion 12, the light reflecting structure 24 and the light absorbing structure 25 is various.

In some examples, as shown in FIGS. 2a and 8a to 8c, in the sub-pixel region A1, the light absorbing structure 25 is farther away from the light extraction portion 12 than the light reflecting structure 24. That is, the orthographic projection of the light absorbing structure 25 on the first base 11 is farther away from the orthographic projection of the light extraction portion 12 on the first base 11 than the orthographic projection of the light reflecting structure 24 on the first base 11.

In this case, the display principle of the display panel 100 will be schematically described by taking an example in which the refractive index n of the first base 11 is 1.5, the refractive index of the light extraction portion 12 is 1.5, the incident angle δ of the collimated polarized light incident onto the first base 11 is 65°, and a refractive index of the liquid crystal layer 3 varies between 1.5 and 1.8.

As shown in FIG. 8a, a driving voltage is applied to the pixel electrode 23, and a common voltage is applied to the common electrode 14 (for example, a voltage difference between the pixel electrode 23 and the common electrode 14 is 5 V), so that the liquid crystal molecules in the liquid crystal layer 3 are in an upright state (that is, a long axis direction of the liquid crystal molecules is perpendicular to the first base 11).

In this case, the refractive index of the liquid crystal layer 3 is 1.5. It can be considered that the collimated polarized light exiting from the light extraction portion 12 and passing through the liquid crystal layer 3 is not deflected. In this case, the collimated polarized light is totally directed to the light absorbing structure 25 and absorbed by the light absorbing structure 25, so that the display panel 100 is in an L0 state.

Figure 8B:
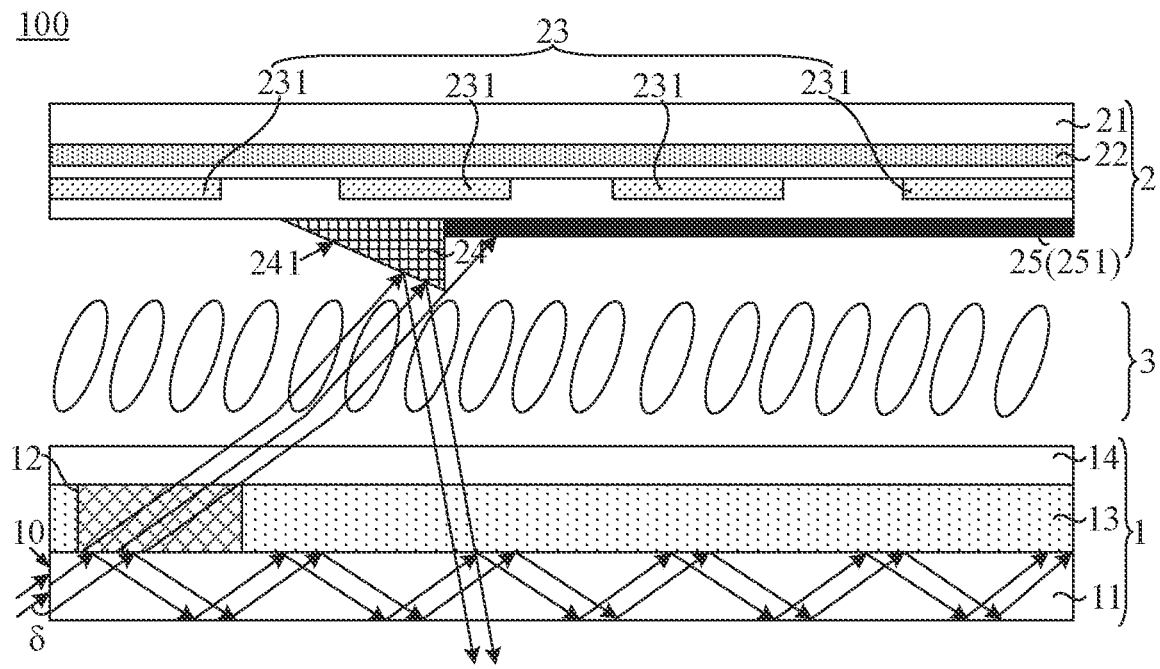
FIG. 8b is another optical path diagram of the display panel shown in FIG. 5.

As shown in FIG. 8b, the value of the driving voltage applied to the pixel electrode 23 is changed to gradually decrease the voltage difference between the pixel electrode 23 and the common electrode 14, so that the liquid crystal molecules gradually change from the upright state to a lying state in which the long axis direction thereof is parallel to the first base 11.

In this case, the refractive index of the liquid crystal layer 3 gradually increases from 1.5 to 1.8. For example, in a case where the voltage difference between the pixel electrode 23 and the common electrode 14 is reduced to 4 V, the refractive index of the liquid crystal layer 3 is 1.6.

In this process, the collimated polarized light is gradually deflected to the light reflecting structure 24, and the collimated polarized light directed to the light absorbing structure 25 is gradually reduced, so that the gray scale displayed by the display panel 100 gradually changes from L0 to L255.

Figure 8C:
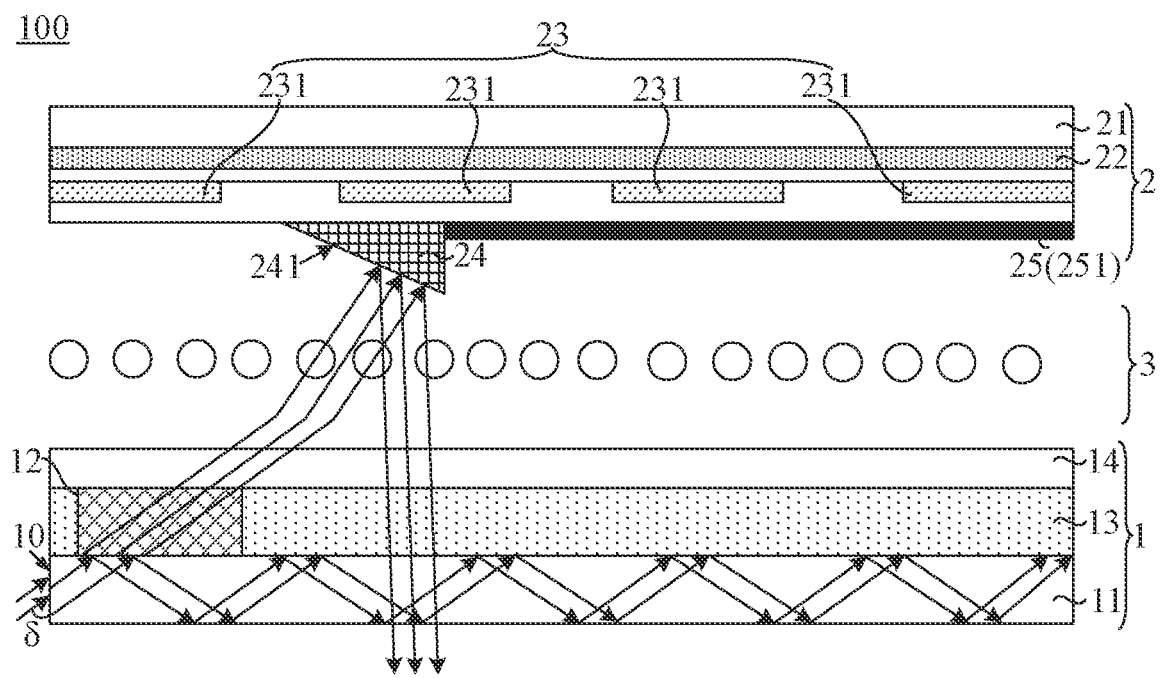
FIG. 8c is yet another optical path diagram of the display panel shown in FIG. 5.

As shown in FIG. 8c, in a case where the voltage difference between the pixel electrode 23 and the common electrode 14 is 0 or close to 0, a state of the liquid crystal molecules may be the lying state in which the long axis direction thereof is parallel to the first base 11.

In this case, the refractive index of the liquid crystal layer 3 is 1.8. For example, in a case where the voltage difference between the pixel electrode 23 and the common electrode 14 is reduced to 0.2 V, the refractive index of the liquid crystal layer 3 is 1.8. In this case, most or even all of the collimated polarized light is deflected onto the light reflecting structure 24, so that the display panel 100 is in an L255 state.

It will be noted that a display mode of the display panel 100 is a normally white mode in these examples.

Based on these examples, a cell thickness of the display panel 100 is designed to be 12 μm, and a dimension of the light extraction portion 12 is 10 μm in a direction from the light incident surface 10 pointing to the second side C2 opposite to the light incident surface 10 in the first base 11. In this case, a light output efficiency of the display panel 100 may reach 76%, a light transmittance of the display panel 100 may reach 20%, a center-to-center distance between two adjacent sub-pixel regions A1 may reach 61.5 μm, and the display panel 100 may reach 413 PPI.

In some other examples, as shown in FIGS. 2b and 8a to 8c, in the sub-pixel region A1, the light absorbing structure 25 is closer to the light extraction portion 12 than the light reflecting structure 24. That is, the orthographic projection of the light reflecting structure 24 on the first base 11 is farther away from the orthographic projection of the light extraction portion 12 on the first base 11 than the orthographic projection of the light absorbing structure 25 on the first base 11.

In this case, the display principle of the display panel 100 will be schematically described by taking an example in which the refractive index n of the first base 11 is 1.5, the refractive index of the light extraction portion 12 is 1.5, the incident angle δ of the collimated polarized light incident onto the first base 11 is 65°, and a refractive index of the liquid crystal layer 3 varies between 1.5 and 1.8.

Figure 9A:
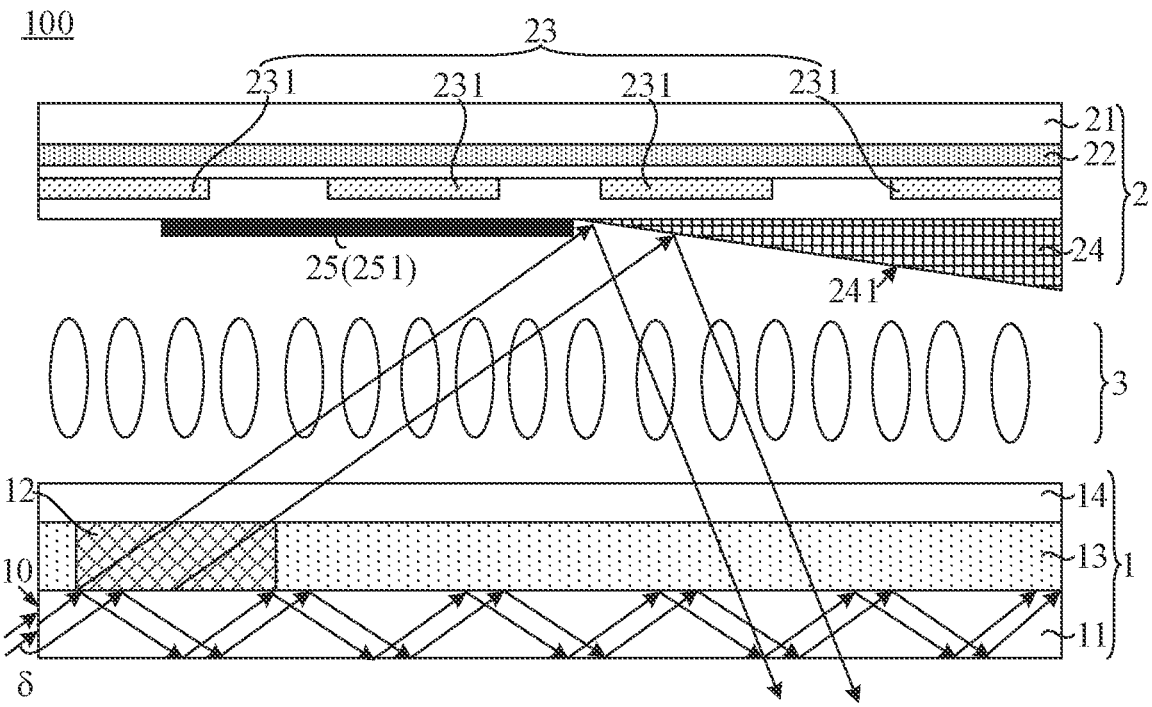
FIG. 9a is an optical path diagram of the display panel shown in FIG. 6.

As shown in FIG. 9a, a driving voltage is applied to the pixel electrode 23, and a common voltage is applied to the common electrode 14 (for example, the voltage difference of the pixel electrode 23 and the common electrode 14 is 5 V), so that the liquid crystal molecules in the liquid crystal layer 3 are in an upright state (that is, the long axis direction of the liquid crystal molecules is perpendicular to the first base 11).

In this case, the refractive index of the liquid crystal layer 3 is 1.5. It may be considered that the collimated polarized light exiting from the light extraction portion 12 and passing through the liquid crystal layer 3 is not deflected. In this case, the collimated polarized light is totally directed to the light reflecting structure 24 and reflected by the light reflecting structure 24 to the first substrate 1 to exit, so that the display panel 100 is in an L255 state.

Figure 9B:
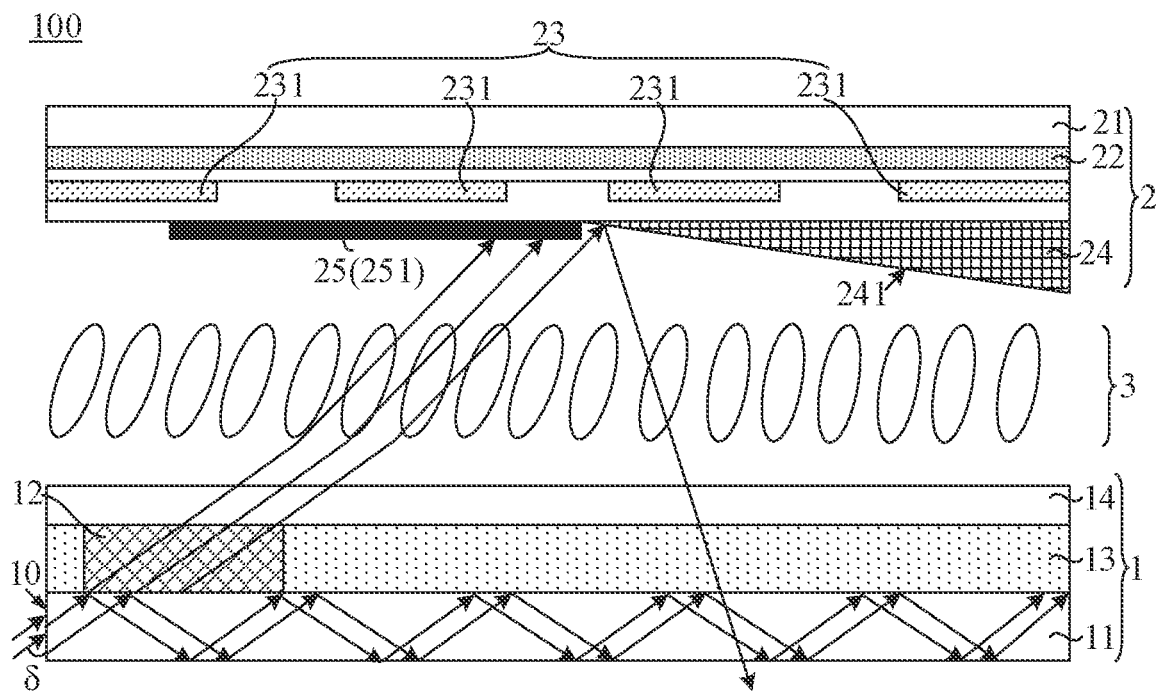
FIG. 9b is another optical path diagram of the display panel shown in FIG. 6.

As shown in FIG. 9b, the value of the driving voltage applied to the pixel electrode 23 is changed to gradually decrease the voltage difference between the pixel electrode 23 and the common electrode 14, so that the liquid crystal molecules gradually change from the upright state to a lying state in which the long axis direction thereof is parallel to the first base 11.

In this case, the refractive index of the liquid crystal layer 3 gradually increases from 1.5 to 1.8. For example, in the case where the voltage difference between the pixel electrode 23 and the common electrode 14 is reduced to 4 V, the refractive index of the liquid crystal layer 3 is 1.6.

In this process, the collimated polarized light is gradually deflected to the light absorbing structure 25, and the collimated polarized light directed to the light reflecting structure 24 is gradually reduced, so that the gray scale displayed by the display panel 100 gradually changes from L254 to L0.

Figure 9C:
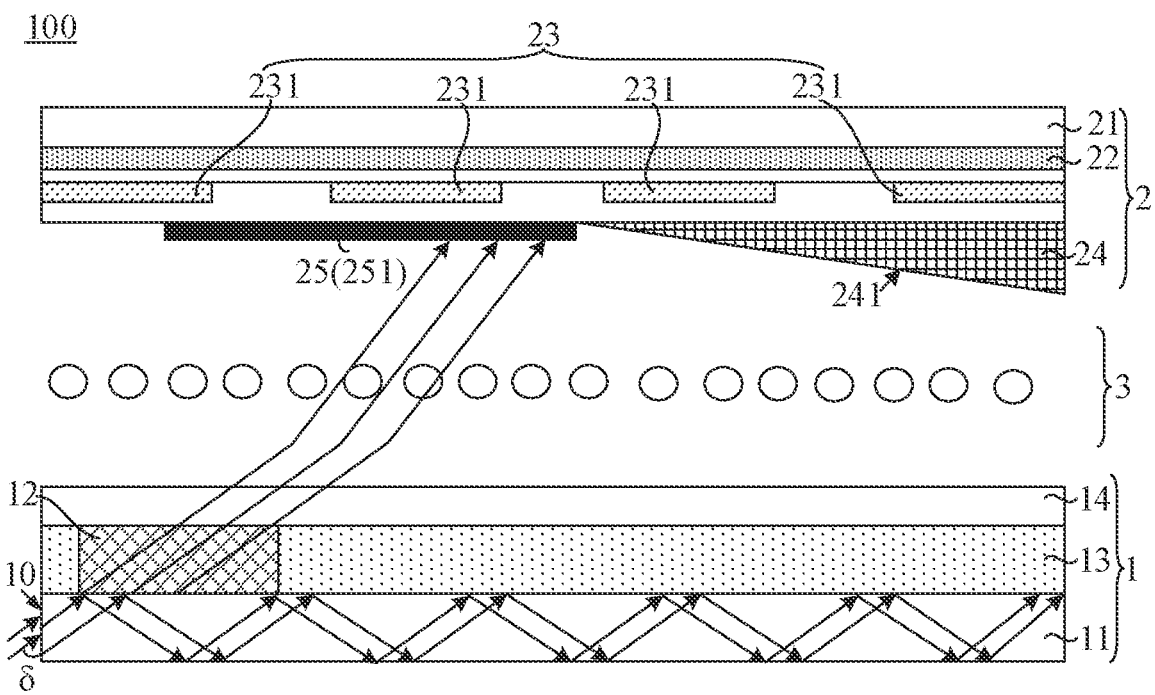
FIG. 9c is yet another optical path diagram of the display panel shown in FIG. 6.

As shown in FIG. 9c, in a case where the voltage difference between the pixel electrode 23 and the common electrode 14 is 0 or close to 0, the state of the liquid crystal molecules may be the lying state in which the long axis direction thereof is parallel to the first base 11.

In this case, the refractive index of the liquid crystal layer 3 is 1.8. For example, in the case where the voltage difference between the pixel electrode 23 and the common electrode 14 is reduced to 0.2 V, the refractive index of the liquid crystal layer 3 is 1.8. In this case, all or almost all of the collimated polarized light is deflected onto the light absorbing structure 25, so that the display panel 100 is in an L0 state.

It will be noted that the display mode of the display panel 100 is a normally black mode in these examples.

Figure 15:
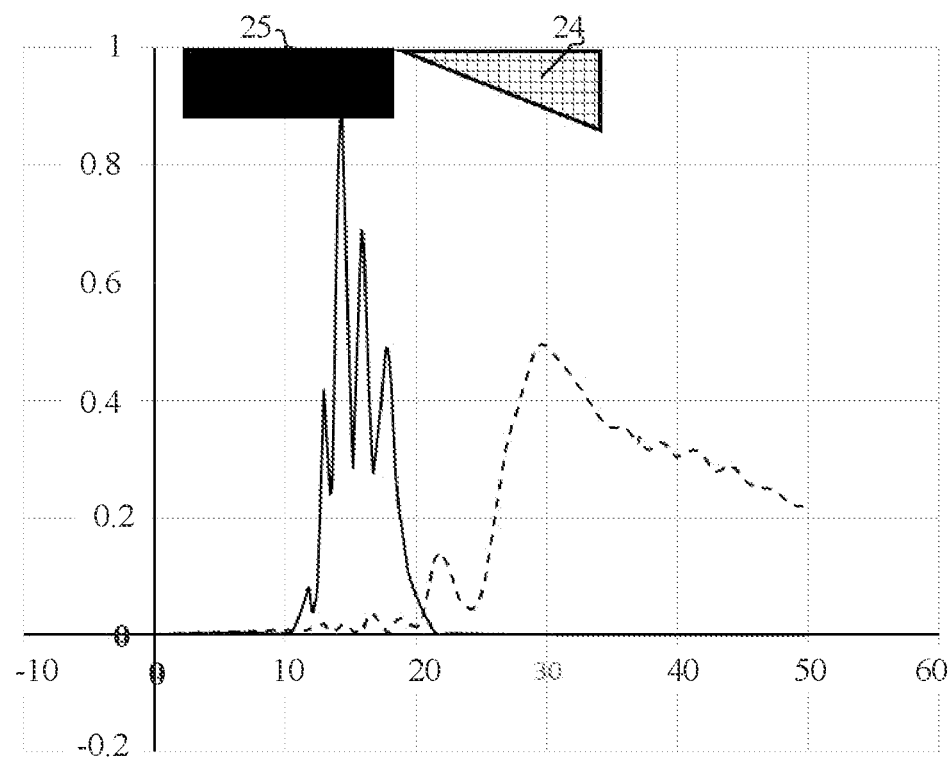
FIG. 15 is a diagram showing energy distribution of light in a display panel after passing through a liquid crystal layer, in accordance with some embodiments of the present disclosure.

As shown in FIG. 15, the dashed line in the figure shows an energy distribution of the collimated polarized light after passing through the liquid crystal layer 3 when the liquid crystal molecules are in the upright state as shown in FIG. 9a. The solid line in the figure shows an energy distribution of the collimated polarized light after passing through the liquid crystal layer 3 when the liquid crystal molecules are in the lying state perpendicular to a paper surface as shown in FIG. 9c. The horizontal axis in the figure represents a distance in μm from the collimated polarized light exiting from the light extraction portion 12, which propagates in the direction of the light incident surface 10 pointing to the second side C2 opposite to the light incident surface 10, to the second substrate 2. The vertical axis represents light intensity of the collimated polarized light that is directed to the second substrate 2 after passing through the liquid crystal layer 3.

As will be seen from FIG. 15, in a case where the liquid crystal molecules are in the lying state perpendicular to the paper surface, the collimated polarized light passing through the liquid crystal layer 3 travels a shorter path to the second substrate 2, a degree of spectral divergence is smaller, and energy distribution is more concentrated. Based on this, in a design where the light absorbing structure 25 is closer to the light extraction portion 12 than the light reflecting structure 24 in each sub-pixel region A1, a contrast ratio is improved in the L0 state.

In some examples, the light reflecting structure 24 is in contact with the light absorbing structure 25.

In some embodiments, as shown in FIGS. 3 and 5 to 7, the light extraction portion 12 is in contact with the light conversion portion 13.

Here, in a process of forming the light extraction portion 12 and the light conversion portion 13, a light conversion film may be fabricated in the sub-pixel regions A1 first, and then the light conversion film is patterned to form openings to obtain the light conversion portions 13; afterwards, the light extraction portions 12 are formed within the openings. In this way, the light extraction portion 12 and the light conversion portion 13 may be in contact with each other naturally.

By setting the light extraction portion 12 in contact with the light conversion portion 13, it may be ensured that the light passing through the first substrate 1 all passes through the light conversion portion 13 to change a color of the light.

Figure 3:
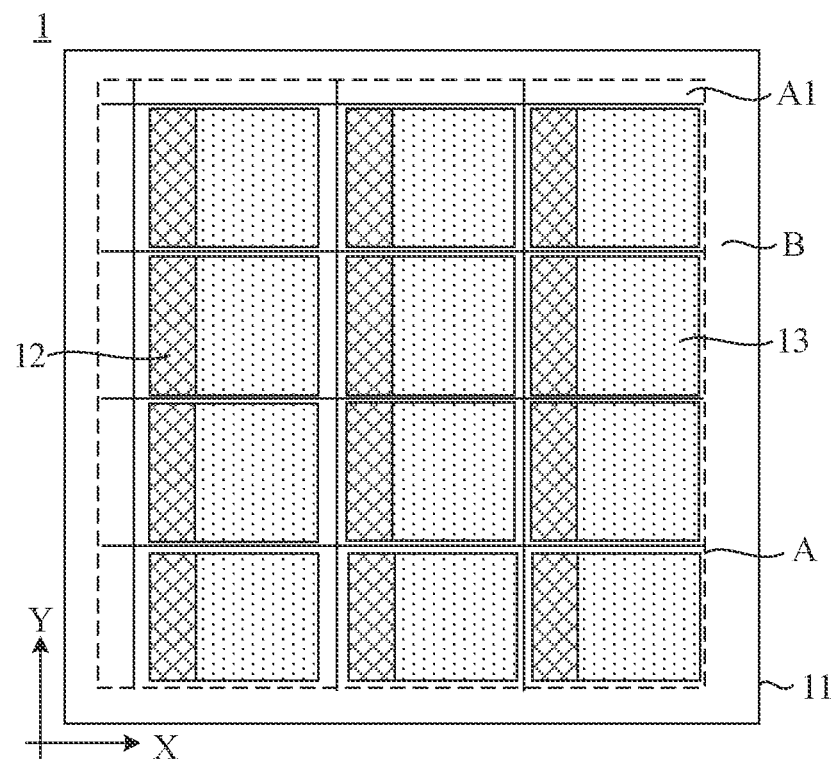
FIG. 3 is a top view of a first substrate, in accordance with some embodiments of the present disclosure.

A positional relationship of the light extraction portion 12 and the light conversion portion 13 is various, which may be selectively set according to actual needs. For example, as shown in FIG. 3, the light extraction portion 12 may be located at an edge of a corresponding sub-pixel region A1. In this case, the light extraction portion 12 is located at an edge of the light conversion portion 13, and the two portions are arranged side by side. For another example, as shown in FIGS. 16 to 19, light extraction portion 12 may be located in the middle of a corresponding sub-pixel region A1. In this case, the light extraction portion 12 may be surrounded the light conversion portion 13 in the corresponding sub-pixel region A1.

In some examples, as shown in FIGS. 5 to 7, a thickness of the light extraction portion 12 (i.e., a dimension of the light extraction portion 12 in a direction perpendicular to the first base 11) is equal to a thickness of the light conversion portion 13 (i.e., a dimension of the light conversion portion 13 in the direction perpendicular to the first base 11). In this way, after the light extraction portion 12 and the light conversion portion 13 are formed on the surface of the first base 11, a surface of the light extraction portion 12 away from the first base 11 may be leveled or substantially leveled with a surface of the light conversion portion 13 away from the first base 11. Therefore, a step difference between the two portions is avoided, and flatness of a layer (e.g., the common electrode 14) formed subsequently may be further ensured.

A structure of the light extraction portion 12 is various. For example, the light extraction portion 12 may have a structure composed of a single film. Of course, the light extraction portion 12 may have a structure composed of a plurality of films stacked in sequence, and a same material may be used for the plurality of films.

For example, in a case where the light extraction portion 12 has the structure composed of a single film, the light extraction portion 12 may be made of an optically clear adhesive (OCA) material. In this way, the light extraction portion 12 and the first base 11 have a same refractive index (for example, refractive indexes are both 1.5).

For the light conversion portion 13, since the plurality of sub-pixel regions A1 in the display area A include first color sub-pixel regions, second color sub-pixel regions and third color sub-pixel regions, the light conversion portion 13 may convert a color of light passing through the light conversion portion 13 into the first color in the first color sub-pixel region; the light conversion portion 13 may convert a color of light passing through the light conversion portion 13 into the second color in the second color sub-pixel region; and the light conversion portion 13 may convert a color of light passing through the light conversion portion 13 into the third color in the third color sub-pixel region. The first, second and third colors are three primary colors. For example, the first, second and third colors are red, green and blue, respectively.

In some examples, the light conversion portion 13 has a structure of at least one film. That is, the light conversion portion 13 may have a structure of a single film or a structure in which a plurality of films are stacked. Here, regardless of the number of films included in the light conversion portion 13, on a basis of ensuring that the refractive index of the portion of the light conversion portion 13 in contact with the first base 11 is less than the refractive index of the first base 11, the light conversion portion 13 mainly functions to convert a color of light passing through itself, so that the display panel 100 can display colors.

For example, as shown in FIG. 5, in a case where the light conversion portion 13 has the structure of the single film, a refractive index of the light conversion portion 13 is less than the refractive index of the first base 11, and the light conversion portion 13 includes a primary color filter portion.

It will be noted that the primary color filter portion refers to a filter portion capable of converting a color of light passing through the primary color filter portion into a primary color. For example, in a case where the first, second and third colors are red, green and blue, respectively, the primary color filter portion may be a red filter portion, a green filter portion or a blue filter portion.

In the case where the light conversion portion 13 has the structure of the single film, it is possible to ensure that the light conversion portion 13 can convert the color of the light passing through itself and a structure of the light conversion portion 13 is simplified, on a basis of ensuring that the light entering the first base 11 can propagate in the total reflection manner inside the first base 11.

For example, as shown in FIG. 6, in a case where the light conversion portion 13 has the structure in which the plurality of films are stacked, the light conversion portion 13 includes a first sub-layer 131 and a second sub-layer 132 that are arranged in a stack.

The first sub-layer 131 is disposed on the first face C1 of the first base 11 (that is, the first sub-layer 131 is in direct contact with the first base 11), the first sub-layer 131 is made of a transparent material, and a refractive index of the first sub-layer 131 is less than the refractive index of the first base 11. The second sub-layer 132 includes a primary color filter portion, and the second sub-layer 132 is disposed on a surface of the first sub-layer 131 away from the first base 11.

For example, taking the refractive index n of the first base 11 being still 1.5 as an example, the refractive index of the first sub-layer 131 may be 1.25. The first sub-layer 131 may be made of, for example, a transparent organic material, which may prevent the first sub-layer 131 from adversely affecting the light transmittance of the light conversion portion 13.

By making the light conversion portion 13 include the first sub-layer 131 and the second sub-layer 132 that are arranged in a stack, it is possible to increase a selectable range of a material of the second sub-layer 132 without considering a refractive index of the material of the second sub-layer 132, on the basis of ensuring that the light entering the first base 11 can propagate in the total reflection manner inside the first base 11.

In some embodiments, as shown in FIGS. 5 to 7, the light reflecting structure 24 in each sub-pixel region A1 includes an inclined reflective surface 241. The inclined reflective surface 241 is configured to reflect light that exits from the light extraction portion 12, passes through the liquid crystal layer 3, and is incident onto the inclined reflective surface 241, so that the reflected light passes through the first substrate 1 to exit.

In some examples, as shown in FIGS. 5 to 7, and 11, the inclined reflective surface 241 faces the light extraction portion 12, and there is an included angle α between the inclined reflective surface 241 and a surface of the second base 21 facing the first base 11. The included angle α is an acute angle.

In this way, it is possible to ensure that the inclined reflective surface 241 can reflect the light that exits from the light extraction portion 12 and is directed to the inclined reflective surface 241, and reduce proportion of space occupied by the inclined reflective surface 241 in a corresponding sub-pixel region A1 to reduce an area of the corresponding sub-pixel region A1, which is conducive to realization of a high PPI.

In some examples, the included angle α between the inclined reflective surface 241 and the surface of the second base 21 facing the first base 11 may be selectively set according to actual needs, so as to ensure that the collimated polarized light reflected by the inclined reflective surface 24134 can be emitted from the sub-pixel region A1 where the light reflecting structure 24 is located, and cannot be directed to other sub-pixel regions A1.

For example, the included angle α between the inclined reflective surface 241 and the surface of second base 21 facing the first base 11 is in a range from 27° to 37°. For example, the included angle α may be 27°, 29°, 30°, 32°, 35°, 37°, or the like.

In each sub-pixel region A1, by setting the included angle α between the inclined reflective surface 241 and the surface of the second base 21 facing the first base 11 in the above range, it is possible to ensure that the light reflected by the inclined reflective surface 241 passes through the light conversion portion 13 in a corresponding sub-pixel region A1. On this basis, a utilization rate of the light conversion portion 13 is improved, an area of an orthographic projection of the light conversion portion 13 on the first base 11 is reduced, an area of the sub-pixel region A1 is reduced, and a high PPI is achieved.

For example, in a direction perpendicular to the second base 21, a distance between an end of the inclined reflective surface 241 proximate to the second base 21 and an end of the inclined reflective surface 241 away from the second base 21 is in a range from 4.5 µm to 10.5 µm. For example, the distance may be 4.5 µm, 5.5 µm, 6 µm, 7.5 µm, 9 µm or 10.5 µm.

In this way, in a case where the light absorbing structure 25 is farther away from the light extraction portion 12 than the light reflecting structure 24, it is possible to avoid a situation that light that should have been absorbed by the light absorbing structure 25 is reflected by the light reflecting structure 24 since the above distance is too large, and further avoid a phenomenon that a gray scale actually displayed is higher than a gray scale that should have been displayed. Or, it is possible to avoid a situation that the light that should have been reflected by the light reflecting structure 24 is absorbed by the light absorbing structure 25 since the above distance is too small, and further avoid a phenomenon that a gray scale actually displayed is lower than a gray scale that should have been displayed.

Thus, by controlling a size and an inclination angle of the inclined reflective surface 241, on a basis of ensuring that light reflected by the light reflecting structure 24 is not directed to an adjacent sub-pixel region A1, a size of each sub-pixel region A1 may be smaller, which is conducive to achieving of the high PPI.

It will be noted that, an arrangement position of the inclined reflective surface 241 in a corresponding sub-pixel region A1 and the size of the inclined reflective surface 241 may be determined according to an arrangement position, size and refractive index of the light extraction portion 12 in the sub-pixel region A1, as well as the cell thickness of the display panel 100, the incident angle of the collimated polarized light and the refractive index of the liquid crystal layer 3.

In this way, in a case where each sub-pixel region A1 is in the L255 state, it may be ensured that the collimated polarized light exiting from the light extraction portion 12 is incident onto the inclined reflective surface 241 of the light reflecting structure 24, is reflected by the inclined reflective surface 241, and then passes through the first base 11 in a corresponding sub-pixel region A1. In a process in which a gray scale of each sub-pixel region A1 is gradually decreased from L255 to L0, collimated polarized light incident onto the inclined reflective surface 241 in the collimated polarized light exiting from the light extraction portion 12 gradually decreases, and collimated polarized light incident onto the light absorbing structure 25 gradually increases.

A structure of the inclined reflective surface 241 is various, which are related to a structure of the light reflecting structure 24.

Figure 11:
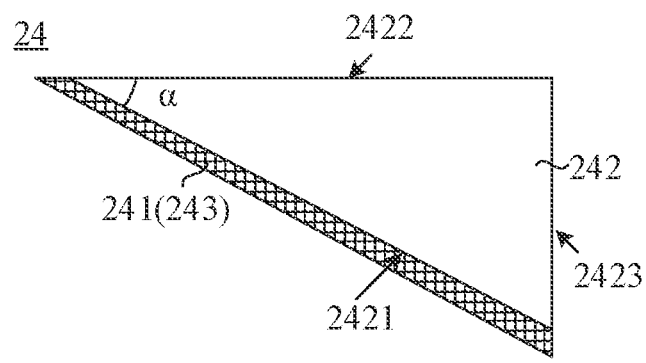
FIG. 11 is a sectional view of a light reflecting structure, in accordance with some embodiments of the present disclosure.

In some embodiments, as shown in FIG. 11, the light reflecting structure 24 includes a body 242, and the body 242 is in a shape of a triangular prism. The body 242 includes an inclined surface 2421, a first prismatic surface 2422 and a second prismatic surface 2423. The first prismatic surface 2422 faces the second base 21, and an included angle between the second prismatic surface 2423 and the first prismatic surface 2422 is greater than or equal to an included angle between light incident onto the light reflecting structure 24 and the first prismatic surface 2422.

In some examples, as shown in FIGS. 5 to 7, the body 242 includes a light reflecting material, and the inclined surface 2421 forms the inclined reflective surface 241.

The inclined reflective surface 241 faces the light extraction portion 12 and the first prismatic surface 2422 faces the second base 21, which means that the second prismatic surface 2423 faces away from the light extraction portion 12.

By setting the included angle between the second prismatic surface 2423 and the first prismatic surface 2422 to be greater than or equal to the included angle between the light incident onto the light reflecting structure 24 and the first prismatic surface 2422, it is possible to avoid affecting the display effect of the display panel 100.

Based on this, the triangular prism may be, for example, a straight triangular prism.

In some other examples, as shown in FIG. 11, the body 242 is made of an organic material. The light reflecting structure 24 further includes a reflective layer 243 disposed on the inclined surface 2421, and the reflective layer 243 forms the inclined reflective surface 241.

Here, the organic material may include, for example, a resin material. A body 242 with the triangular prism shape is more easily fabricated by utilizing an organic material on a process (including, for example, a coating process and an exposure process).

A material of the reflective layer 243 is various, as long as the material has a high light reflectivity. For example, the material of the reflective layer 243 may include aluminum (Al).

A structure of the light absorbing structure 25 is various, which may be selectively set according to actual needs.

In some embodiments, as shown in FIGS. 5 to 7 and 12a to 13b, the light absorbing structure 25 includes a black matrix 251 and/or a black spacer 252.

Figure 12A:
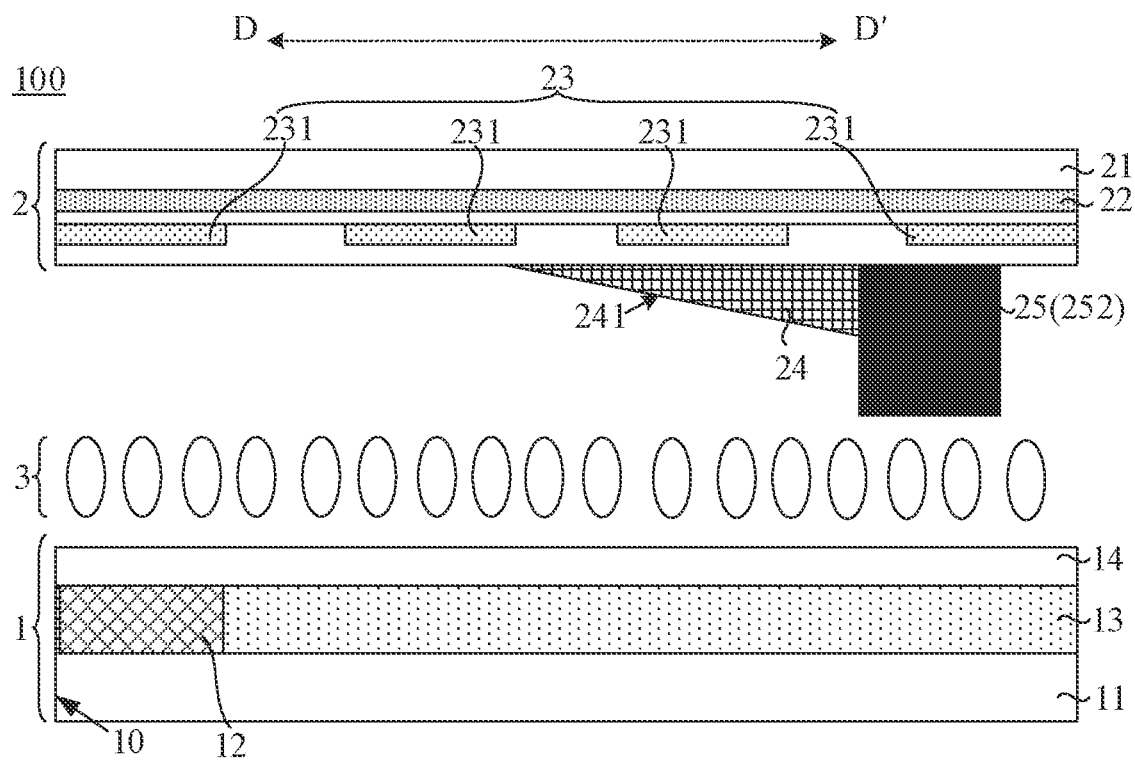
FIG. 12a is a sectional view of yet another display panel shown in FIG. 1 taken along the D-D' line.
Figure 12B:
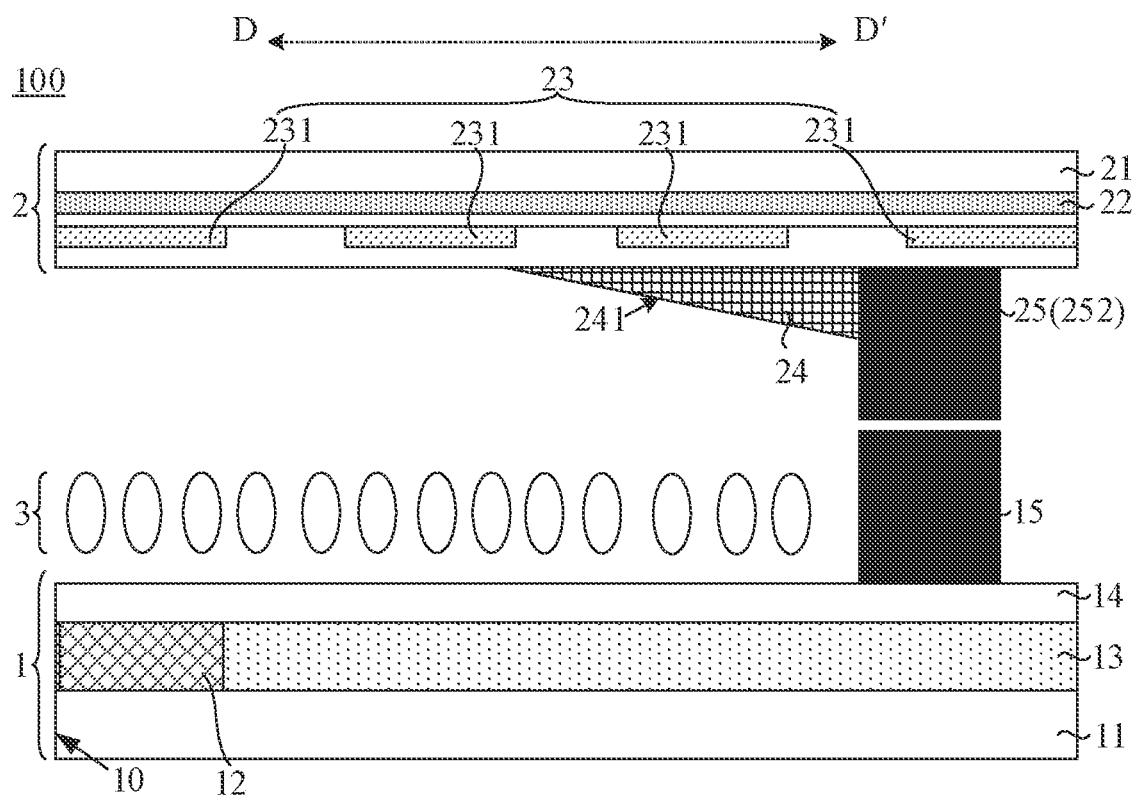
FIG. 12b is a sectional view of yet another display panel shown in FIG. 1 taken along the D-D' line.
Figure 13A:
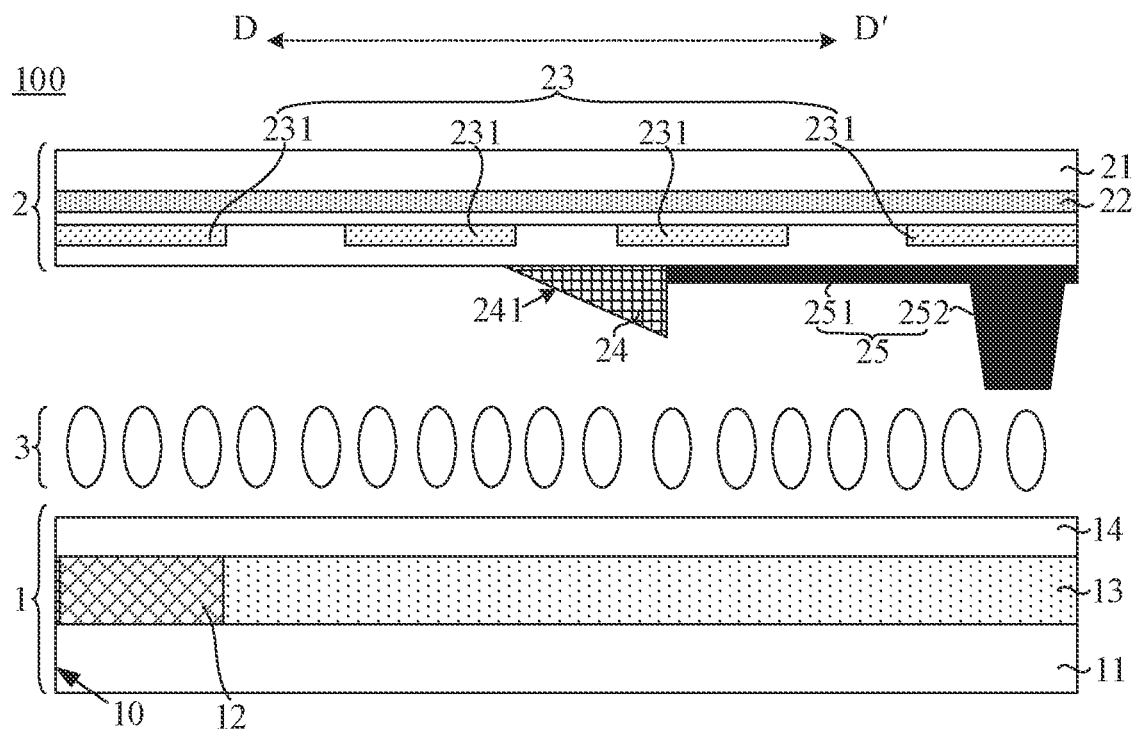
FIG. 13a is a sectional view of yet another display panel shown in FIG. 1 taken along the D-D' line.
Figure 13B:
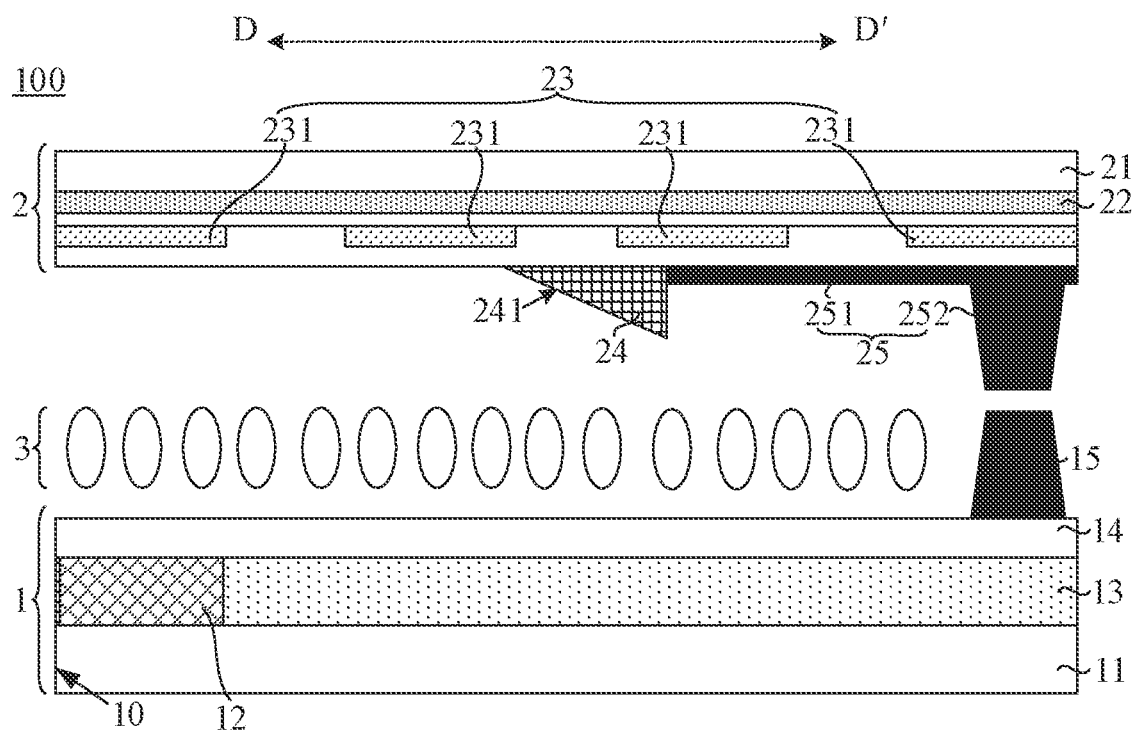
FIG. 13b is a sectional view of yet another display panel shown in FIG. 1 taken along the D-D' line.

As shown in FIGS. 5 to 7, the light absorbing structure 25 may be the black matrix 251. Or, as shown in FIGS. 12a and 12b, the light absorbing structure 25 may be the black spacer 252. Or, as shown in FIGS. 13a and 13b, the light absorbing structure 25 may include both the black matrix 251 and the black spacer 252.

For example, the black matrix 251 in each sub-pixel region A1 is in a stripe shape, and the black matrices 251 in every two adjacent sub-pixel regions A1 are connected to each other. In addition, a plurality of black matrices 251 may be provided in a direction perpendicular to the light incident surface 10, so that the black matrices 251 in the plurality of sub-pixel regions A1 of the display panel 100 form a grid structure. The grid structure may cover the plurality of gate lines GL, the plurality of data lines DL and the transistors 22 in the second substrate 2, so as to prevent external light incident onto the second substrate 2 through the first substrate 1 from being reflected to reduce a contrast of the display panel 100.

Here, an arrangement manner of the light absorbing structure 25 may be determined according to a size of the light extraction portion 12. The size of the light extraction portion 12 refers to a dimension of the light extraction portion 12 in a propagation direction of light in the first base 11, i.e., in the direction of the light incident surface 10 pointing to the second side C2 opposite to the light incident surface 10 in the first base 11.

For example, in a case where the dimension of the light extraction portion 12 is in a range from 5 µm to 10 µm, the light absorbing structure 25 may adopt such a lateral shielding manner of the black matrix 251.

For example, in a case where the dimension of the light extraction portion 12 is relatively large, for example, up to 20 µm or even more, the light absorbing structure 25 may adopt such a vertical shielding manner of the black spacer 252.

Of course, the light absorbing structure 25 may also adopt an arrangement manner of the black matrix 251 plus the black spacer 252 according to the dimension of the light extraction portion 12.

In some examples, as shown in FIGS. 13a and 13b, in the case where the light absorbing structure 25 includes the black matrix 251 and the black spacer 252, the black spacer 252 is located on a side of the black matrix 251 away from the second base 21, and is in contact with the black matrix 251. In addition, a distance between the light reflecting structure 24 and an edge of the black spacer 252 proximate to the light reflecting structure 24 is greater than a distance between the light reflecting structure 24 and an edge of the black matrix 251 proximate to the light reflecting structure 24.

In this way, it is possible to not only ensure that, relative to the second base, a surface of the black spacer 252 away from the second base 21 is higher than a surface of the black matrix 251 away from the second base 21, but also effectively use the black spacer 252 for vertical shielding.

In some examples, in a case where the light absorbing structure 25 includes the black spacer 252, as shown in FIGS. 12b and 13b, the first substrate 1 further includes an opposite black spacer 15 disposed at a side of the light conversion portion 13 away from the first base 11. An orthographic projection of the opposite black spacer 15 on the first base 11 is at least partially overlapped with an orthographic projection of the black spacer 252 on the first base 11.

For example, one opposite black spacer 15 is provided in each sub-pixel region A1, and the orthographic projection of the opposite black spacer 15 on the first base 11 may be partially overlapped with the orthographic projection of the black spacer 252 on the first base 11, that is, the opposite black spacer 15 and the black spacer 252 are partially opposite. Or, the orthographic projection of the opposite black spacer 15 on the first base 11 may be overlapped with the orthographic projection of the black spacer 252 on the first base 11, that is, the opposite black spacer 15 and the black spacer 252 are opposite to each other.

For example, the opposite black spacer 15 and the black spacer 252 are the same in shape and size, which is conducive to simplifying a process of manufacturing the display panel 100.

It will be noted that, considering that a thickness of the black spacer 252 (i.e., a dimension of the black spacer 252 in a direction perpendicular to the first base 11) is larger than thicknesses of other film layers, but is limited by the manufacturing process, the thickness of the black spacer 252 can reach approximately 5 µm, which makes it difficult to satisfy a shielding requirement of L0 in a case where the cell thickness of the display panel 100 is relatively large. Therefore, the shielding requirement of L0 may be effectively satisfied by providing the opposite black spacer 15.

Here, that the light absorbing structure 25 includes the black spacer 252 means that the light absorbing structure 25 is the black spacer 252, or the light absorbing structure 25 includes the black matrix 251 and the black spacer 252.

For the second substrate 2, an arrangement position and size of the light absorbing structure 25 in each sub-pixel region A1 may be determined according to the arrangement position, size and refractive index of the light extraction portion 12 in the sub-pixel region A1, as well as the cell thickness of the display panel 100, the incident angle of the collimated polarized light and the refractive index of the liquid crystal layer 3. In this way, it is possible to ensure that the collimated polarized light emitted from the light extraction portion 12 is totally incident onto the light absorbing structure 25 and is absorbed by the light absorbing structure 25 in a case where the sub-pixel region A1 is in a L0 state.

In some embodiments, as shown in FIG. 14, the first substrate 1 further includes a first orientation layer 16 disposed at a side of both the light extraction portion 12 and the light conversion portion 13 proximate to the second substrate 2, and the second substrate 2 further includes a second orientation layer 26 disposed on a side of both the light reflecting structure 24 and the light absorbing structure 25 proximate to the first substrate 1. Orientation directions 161, 261 of the first orientation layer 16 and the second orientation layer 26 are the same or substantially the same.

In this way, initial states of the liquid crystal molecules in the liquid crystal layer 3 may be ensured to face a same direction, and thus a propagation direction of the collimated polarized light after passing through the liquid crystal layer 3 may be controlled, so that the display panel 100 realizes gray scale display of L0 to L255.

In some examples, as shown in FIG. 14, in a case where the display panel 100 further includes the polarizer 4, an extending direction of the transmission axis 41 of the polarizer 4, the orientation direction 161 of the first orientation layer 16 and the orientation direction 261 of the second orientation layer 26 are the same or substantially the same. FIG. 14 illustrates the three directions being a direction perpendicular to the paper surface.

The orientation direction of the first orientation layer 16 and the orientation direction of the second orientation layer 26 are both parallel to the first base 11, and the extending direction of the transmission axis of the polarizer 4 is parallel to the light incident surface 10, which means that the three directions are all parallel to the first base 11. The structure shown in FIG. 14 is taken as an example, and the three directions are all perpendicular to the paper surface.

In some embodiments, as shown in FIGS. 16 to 19, the display panel 100 further includes a reflective sheet 5 disposed on a second side C2 opposite to the light incident surface 10 in the plurality of second sides C2 of the first base 11.

The reflective sheet 5 has a high light reflectivity. For example, a material of the reflective sheet 5 may be silver or aluminum.

Figure 2C:
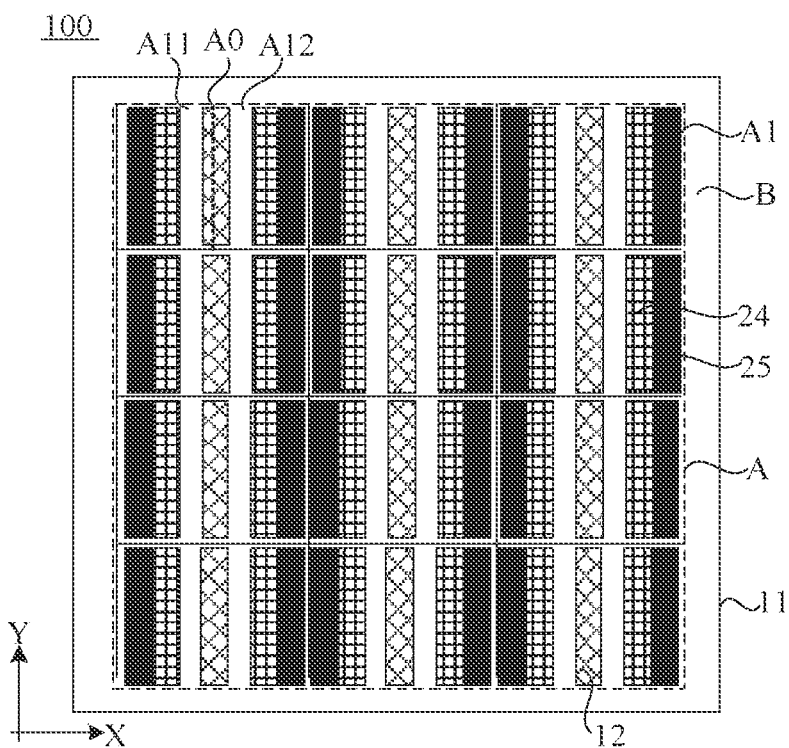
FIG. 2c is a top view of yet another display panel, in accordance with some embodiments of the present disclosure.

In some examples, as shown in FIGS. 16 to 19, the sub-pixel region A1 includes: a first sub-pixel sub-region A11, and a second sub-pixel sub-region A12 that is located on a side of the first sub-pixel sub-region A11 and adjacent to the first sub-pixel sub-region A11. The first sub-pixel sub-region A11 and the second sub-pixel sub-region A12 are arranged in a direction of the light incident surface 10 pointing to the reflective sheet 5. Each of the first sub-pixel sub-region A11 and the second sub-pixel sub-region A12 is provided with a light reflecting structure 24 and a light absorbing structure 25. The light reflecting structure 24 in the first sub-pixel sub-region A11 and the light reflecting structure 24 in the second sub-pixel sub-region A12 are symmetrical with respect to a joint line A0 of the first sub-pixel sub-region A11 and the second sub-pixel sub-region A12 (as shown in FIG. 2c). The light absorbing structure 25 in the first sub-pixel sub-region A11 and the light absorbing structure 25 in the second sub-pixel sub-region A12 are symmetrical with respect to the joint line A0 of the first sub-pixel sub-region A11 and the second sub-pixel sub-region A12 (as shown in FIG. 2c).

Figure 16:
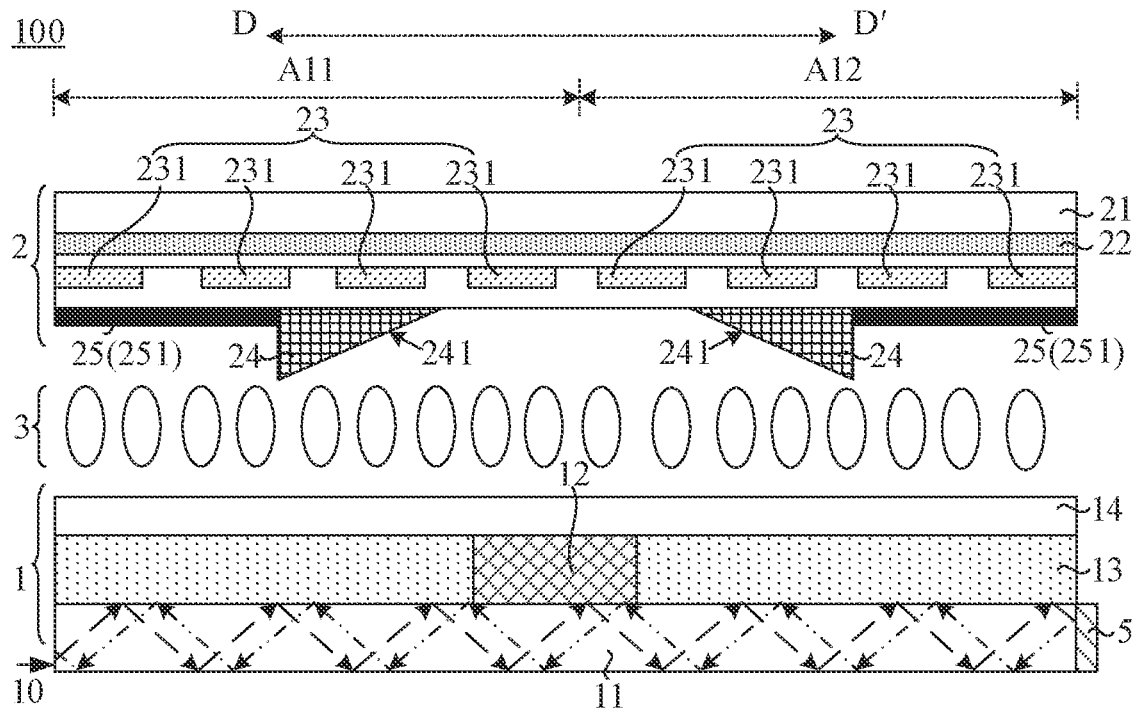
FIG. 16 is a sectional view of yet another display panel shown in FIG. 1 taken along the D-D' line.

By providing the reflective sheet 5 on the second side C2 of the first base 11 opposite to the light incident surface 10, light incident onto the second side C2 can be reflected toward the light incident surface 10. Based on this, as shown in FIG. 16, there is light propagating in two directions in the first base 11, that is, a part of light propagates in the direction of the light incident surface 10 pointing to the second side C2, and the other part of light propagates in a direction of the second side C2 pointing to the light incident surface 10.

On this basis, since the light emitted from the light extraction portion 12 is light in two directions, by providing the light reflecting structure 24 and the light absorbing structure 25 in both the first sub-pixel sub-region A11 and the second sub-pixel sub-region A12 of each sub-pixel region A1, the light in the two directions may be reflected to the first substrate 1, thereby further improving the utilization rate of light and the light transmittance (e.g., up to 25%).

In the first sub-pixel sub-region A11 and the second sub-pixel sub-region A12, a propagation path of light may refer to the description of FIGS. 8a to 8c in some embodiments described above, or the description of FIGS. 9a to 9c, which is not repeated herein.

In some examples, a shape, size, etc. of the light reflecting structure 24 in the first sub-pixel sub-region A11 are the same as a shape, size, etc. of the light reflecting structure 24 in the second sub-pixel sub-region A12, respectively. A shape, size, etc. of the light absorbing structure 25 in the first sub-pixel sub-region A11 are the same as a shape, size, etc. of the light absorbing structure 25 in the second sub-pixel sub-region A12, respectively. The light extraction portion 12 is located in the middle of the sub-pixel region A1, and its extending direction is the same as an extending direction of the joint line of the first sub-pixel sub-region A11 and the second sub-pixel sub-region A12.

In this way, a reflection effect (or absorption effect) of the light reflecting structure 24 (or the light absorbing structure 25) in each sub-pixel sub-region on the light in a corresponding propagation direction may be effectively ensured, thereby ensuring the display effect of the display panel 100.

In some examples, the pixel electrode 23 in the first sub-pixel sub-region A11 and the pixel electrode 23 in the second sub-pixel sub-region A12 are independently provided, that is, the pixel electrode 23 in the first sub-pixel sub-region A11 and the pixel electrode 23 in the second sub-pixel sub-region A12 are insulated from each other. The pixel electrodes 23 in the first sub-pixel sub-region A11 and the second sub-pixel sub-region A12 each include a plurality of strip-shaped sub-electrodes 231 spaced apart from one another.

Here, in a case where the pixel electrodes 23 in the first sub-pixel sub-region A11 and the second sub-pixel sub-region A12 are independently provided, the transistors 22 electrically connected to the pixel electrodes 23 are also independently provided.

Figure 17:
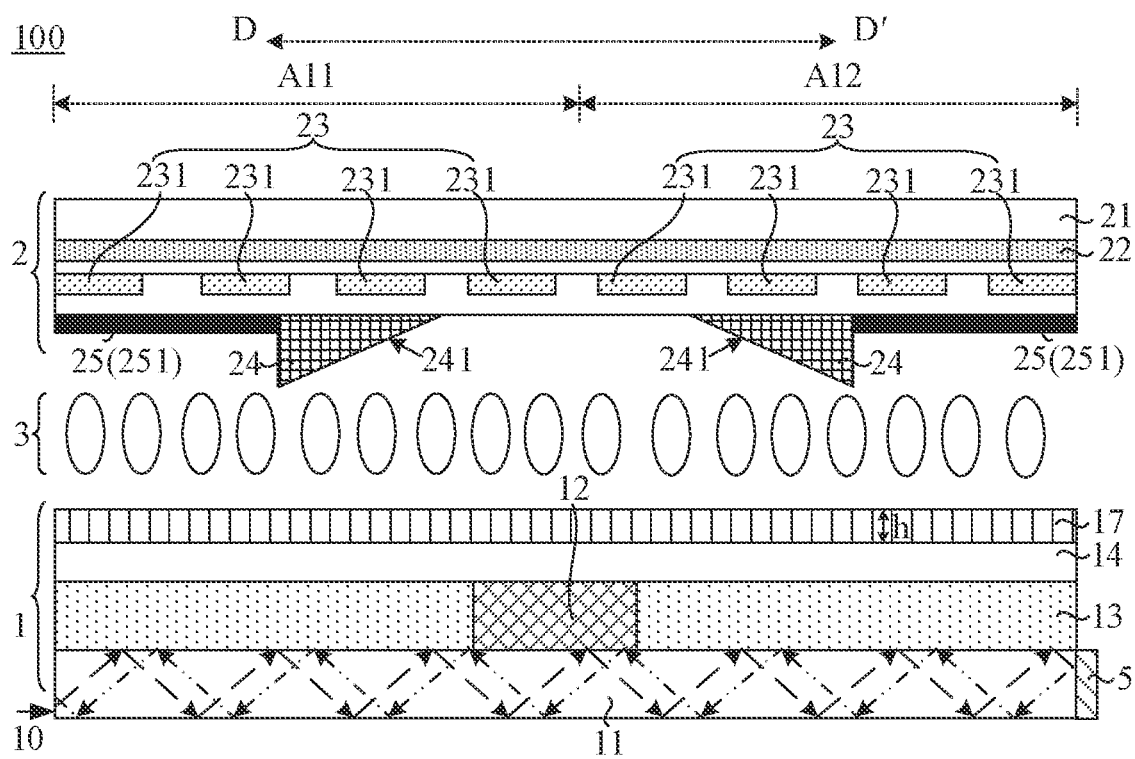
FIG. 17 is a sectional view of yet another display panel shown in FIG. 1 taken along the D-D' line.
Figure 18:
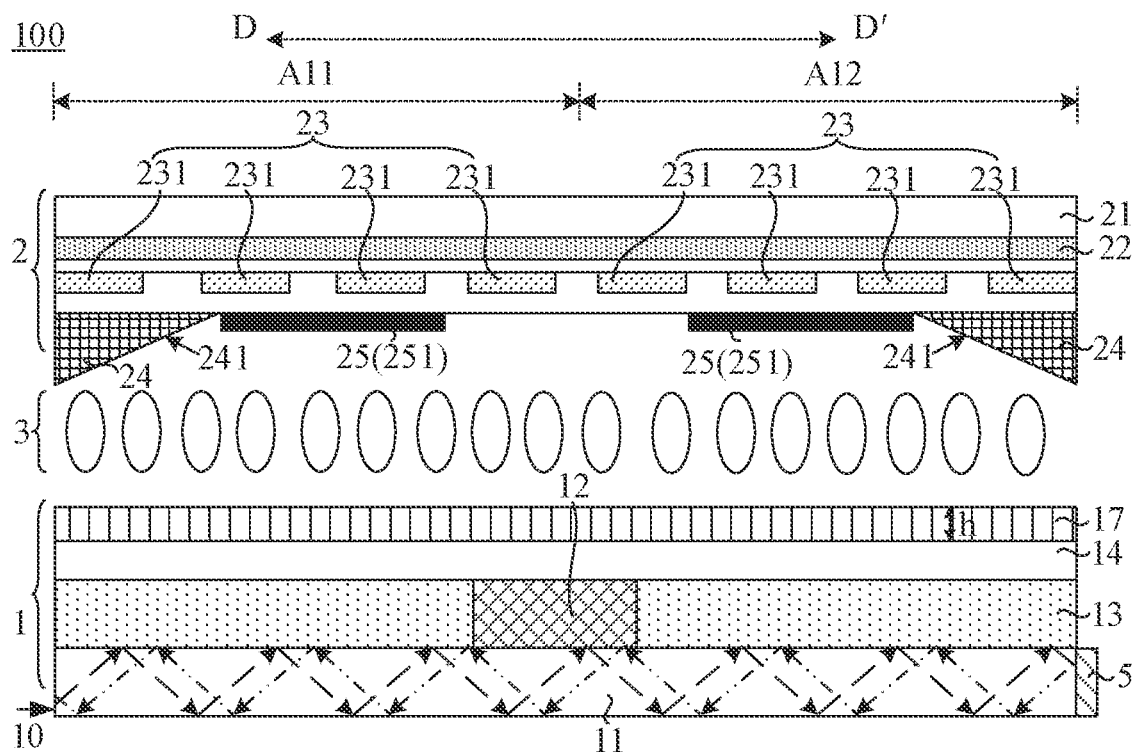
FIG. 18 is a sectional view of yet another display panel shown in FIG. 1 taken along the D-D' line.
Figure 19:
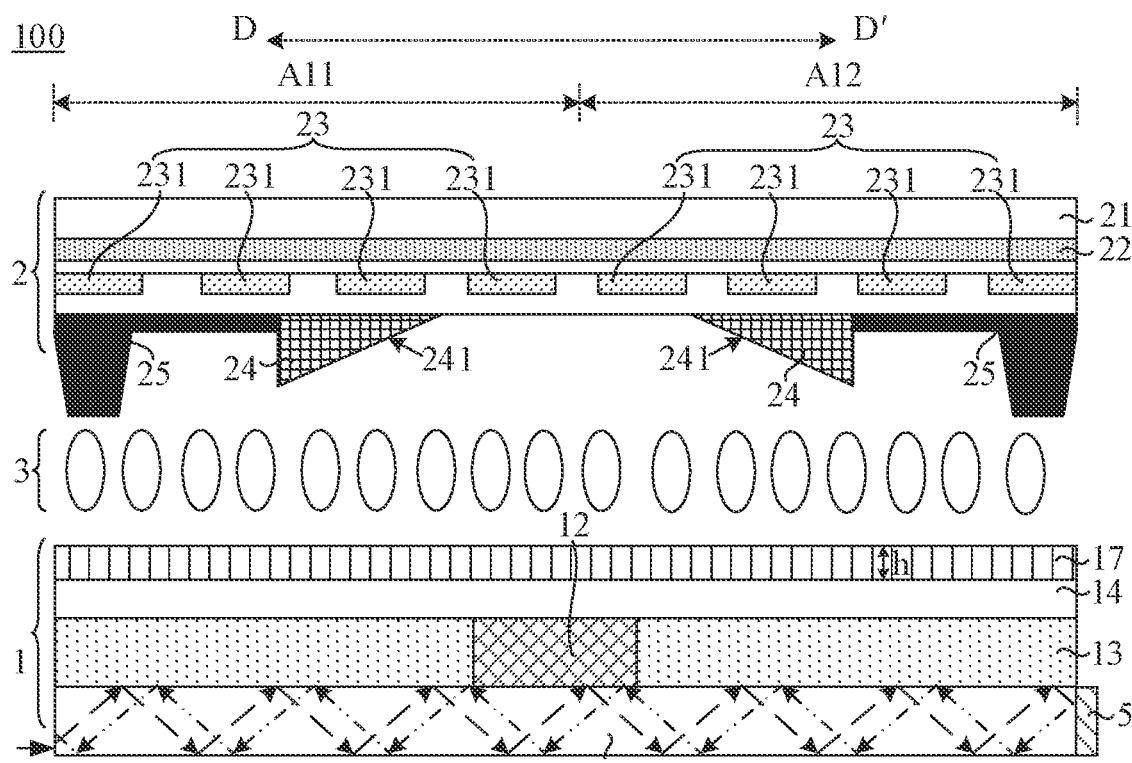
FIG. 19 is a sectional view of yet another display panel shown in FIG. 1 taken along the D-D' line.

In some embodiments, as shown in FIGS. 17 to 19, the first substrate 1 further includes a buffer layer 17 disposed at a side of both the light extraction portion 12 and the light conversion portion 13 away from the first base 11.

In some examples, as shown in FIGS. 17 to 19, a thickness of the buffer layer 17 is h, and $$h \geq \frac{d}{2} \times \cot\theta.$$

Here, d is a dimension of the light extraction portion 12 in the direction of the light incident surface 10 pointing to the reflective sheet 5, and θ is an included angle between light exiting from the light extraction portion 12 and a normal perpendicular to the first base 11.

By providing the buffer layer 17, light with opposite propagation directions that is extracted from the first base 11 is emitted from the buffer layer 17 and then directed to the liquid crystal molecules in the first sub-pixel sub-region A11 and the second sub-pixel sub-region A12, respectively, thereby avoiding crosstalk.

Figure 20:
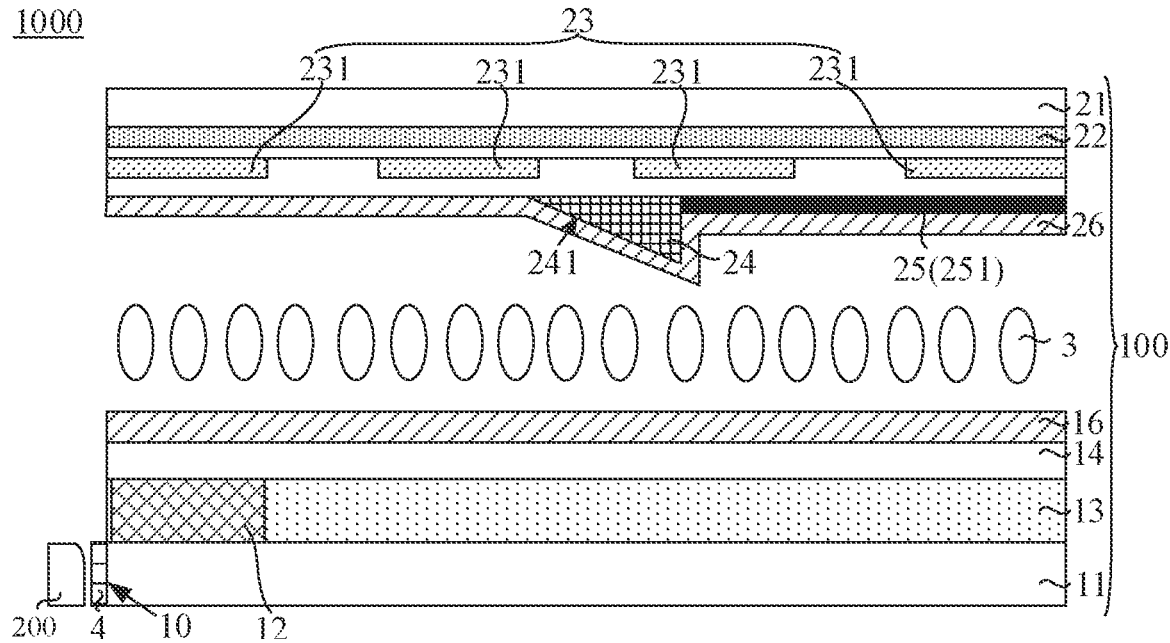
FIG. 20 is a structural diagram of a display device, in accordance with some embodiments of the present disclosure.

Some embodiments of the present disclosure also provide a display device 1000. As shown in FIG. 20, the display device 1000 includes the display panel 100 as described in some embodiments above.

Based on the above, as shown in FIG. 20, the display device 1000 further includes a backlight 200. The backlight 200 is disposed at a side of the light incident surface 10 of the first base 11 in the display panel 100. The backlight 200 is configured to emit collimated light, and to make the collimated light enter the first base 11 and propagate in a total reflection manner in the first base 11. The collimated light includes collimated polarized light or collimated natural light. In a case where the display panel 100 does not include a polarizer, the collimated light is collimated polarized light.

In some examples, an incident angle of the collimated light is δ, and $$\delta \geq \arcsin\frac{n'}{n}.$$

Here, n is the refractive index of the first base 11, and n' is the refractive index of the portion of the light conversion portion 13 in contact with the first base 11.

Beneficial effects that may be achieved by the display device 1000 provided by some embodiments of the present disclosure are the same as the beneficial effects that may be achieved by the display panel 100 provided by some embodiments described above, which will not be described herein again.

In some embodiments, the display device 1000 may be any device that displays an image whether in motion (e.g., video) or stationary (e.g., still images) and regardless of literal or graphical. More particularly, it is contemplated that the embodiments may be practiced in or associated with a variety of electronic devices such as, but not limited to, mobile phones, wireless devices, personal digital assistants (PDAs), hand-held or portable computers, global positioning system (GPS) receivers/navigators, cameras, moving picture experts group 4 (MP4) video players, video cameras, game consoles, watches, clocks, calculators, television monitors, computer monitors, automobile displays (e.g., odometer displays, etc.), navigators, cockpit controllers and/or displays, displays for camera views (e.g., displays for rear view cameras in vehicles), electronic photographs, electronic billboards or signs, projectors, building structures, packaging, and aesthetic structures (e.g., displays of images for a piece of jewelry), and the like.

Figure 21:
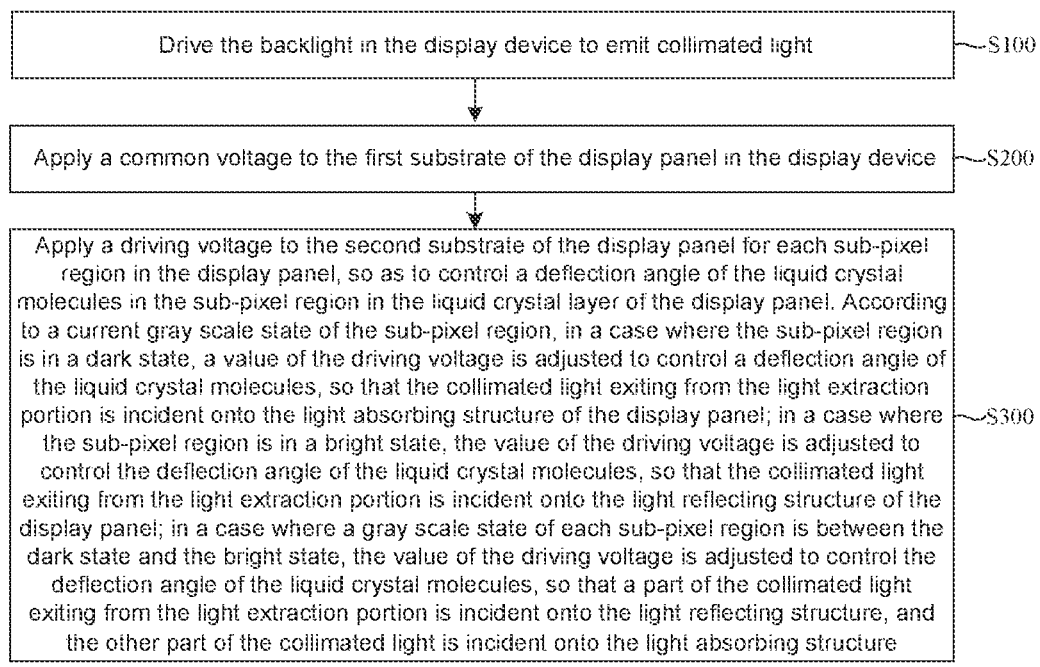
FIG. 21 is a flow diagram of a method of driving a display device, in accordance with some embodiments of the present disclosure.

Some embodiments of the present disclosure also provide a method of driving a display device, which is applied to the display device 1000 provided by some embodiments described above. As shown in FIG. 21, the method includes S100 to S300.

In S100, the backlight in the display device is driven to emit collimated light.

In S200, a common voltage is applied to the first substrate of the display panel in the display device.

Here, applying a common voltage to the first substrate means applying the common voltage to the common electrode in the first substrate.

In S300, for each sub-pixel region in the display panel, a driving voltage is applied to the second substrate of the display panel, so as to control a deflection angle of the liquid crystal molecules in the sub-pixel region in the liquid crystal layer of the display panel.

Here, applying a driving voltage to the second substrate means applying the driving voltage to a pixel electrode in the second substrate. In a process of inputting scanning signals to the plurality of gate lines in the second substrate row by row, a driving voltage may be applied to the pixel electrode in each sub-pixel region through the data line.

In some examples, according to a current gray scale state of each sub-pixel region in the display device, a driving voltage applied to a pixel electrode may be adjusted to control the refractive index of the liquid crystal layer and adjust a deflection degree of light, so that each sub-pixel region displays a gray scale required to be displayed.

For example, in a case where the sub-pixel region is in a dark state (e.g., L0), a value of the driving voltage is adjusted to control a deflection angle of the liquid crystal molecules, so that the collimated light exiting from the light extraction portion is incident onto the light absorbing structure of the display panel.

Here, the collimated light incident onto the light absorbing structure may be all or most of the collimated light exiting from the light extraction portion.

For example, in a case where the sub-pixel region is in a bright state (e.g., L255), the value of the driving voltage is adjusted to control the deflection angle of the liquid crystal molecules, so that the collimated light exiting from the light extraction portion is incident onto the light reflecting structure of the display panel.

Here, the collimated light incident onto the light reflecting structure may be all or most of the collimated light exiting from the light extraction portion.

For example, in a case where a gray scale state of each sub-pixel region is between the dark state and the bright state (e.g., any gray scale from L1 to L254), the value of the driving voltage is adjusted to control the deflection angle of the liquid crystal molecules, so that a part of the collimated light exiting from the light extraction portion is incident onto the light reflecting structure, and the other part of the collimated light is incident onto the light absorbing structure.

In this example, the adjustment of the value of the driving voltage and the control of the deflection angle of the liquid crystal molecules may refer to the descriptions in some embodiments above, which will not be described herein again.

It will be noted that the above step numbers "S100", "S200" and "S300" are only for clearly describing the contents of the steps, and do not define an order in which the steps are performed. For example, the above three steps may be performed simultaneously.

The above descriptions are merely specific implementations of the present disclosure, but the protection scope of the present disclosure is not limited thereto. Any change or replacement those skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel having a display area including a plurality of sub-pixel regions, the display panel comprising:
    a first substrate and a second substrate that are oppositely arranged; and
    a liquid crystal layer disposed between the first substrate and the second substrate, wherein
    the first substrate includes:
    a first base having a first side facing the second substrate and a plurality of second sides intersecting the first side; and
    a light extraction portion and a light conversion portion that are disposed on the first side and located in each sub-pixel region, a refractive index of the light extraction portion being greater than or equal to a refractive index of the first base, a refractive index of a portion of the light conversion portion in direct contact with the first base being less than the refractive index of the first base, and at least one second side being a light incident surface;
    the second substrate includes:
    a second base;
    at least one light reflecting structure and at least one light absorbing structure that are disposed at a side of the second base facing the first substrate and located in a sub-pixel region of the plurality of sub-pixel regions; at least one side of the light reflecting structure being provided with the light absorbing structure; and
    the light reflecting structure is configured to reflect light that exits from the light extraction portion, passes through the liquid crystal layer, and is incident onto the light reflecting structure, so that the reflected light passes through the first substrate to exit; the light absorbing structure is configured to absorb light that exits from the light extraction portion, passes through the liquid crystal layer, and is incident onto the light absorbing structure.

2. The display panel according to claim 1, wherein a shape of an orthographic projection of the light extraction portion on the first base includes a stripe shape, a shape of an orthographic projection of the light reflecting structure on the first base includes a stripe shape, and a shape of an orthographic projection of the light absorbing structure on the first base includes a stripe shape; and
    an extending direction of the light extraction portion, an extending direction of the light reflecting structure and an extending direction of the light absorbing structure are all parallel to the light incident surface.

3. The display panel according to claim 1, wherein the light reflecting structure is in direct contact with the light absorbing structure, and an orthographic projection of the light absorbing structure on the first side of the first base is farther away from an orthographic projection of the light extraction portion on the first side of the first base than an orthographic projection of the light reflecting structure on the first side of the first base.

4. The display panel according to claim 1, wherein the light reflecting structure is in direct contact with the light absorbing structure, and an orthographic projection of the light absorbing structure on the first side of the first base is closer to an orthographic projection of the light extraction portion on the first side of the first base than an orthographic projection of the light reflecting structure on the first side of the first base.

5. The display panel according to claim 1, wherein the light extraction portion is in direct contact with the light conversion portion.

6. The display panel according to claim 1, wherein the light conversion portion has a structure of at least one film, wherein
    the light conversion portion has a structure of a single film, a refractive index of the light conversion portion is less than the refractive index of the first base, and the light conversion portion includes a primary color filter portion; or the light conversion portion has a structure in which a plurality of films are stacked, the light conversion portion includes a first sub-layer and a second sub-layer that are arranged in a stack;

the first sub-layer is disposed on the first side of the first base, the first sub-layer is made of a transparent material, and a refractive index of the first sub-layer is less than the refractive index of the first base; and the second sub-layer is disposed on a surface of the first sub-layer away from the first base, and the second sub-layer includes a primary color filter portion.

7. The display panel according to claim 1, wherein the light reflecting structure includes an inclined reflective surface, and the inclined reflective surface faces the light extraction portion; the inclined reflective surface and a surface of the second base facing the first base have an included angle therebetween, and the included angle is an acute angle; and the inclined reflective surface is configured to reflect light that exits from the light extraction portion, passes through the liquid crystal layer, and is incident onto the inclined reflective surface, so that the reflected light passes through the first substrate to exit.

8. The display panel according to claim 7, wherein the light reflecting structure includes a body, and the body is in a shape of a triangular prism;

the body includes an inclined surface, a first prismatic surface and a second prismatic surface that are sequentially connected, the first prismatic surface faces the second base, and an included angle between the second prismatic surface and the first prismatic surface is greater than or equal to an included angle between light incident onto the light reflecting structure and the first prismatic surface;

a material of the body includes a light reflecting material; the inclined surface is the inclined reflective surface; or the body is made of an organic material; the light reflecting structure further includes a reflective layer disposed on the inclined surface, and the reflective layer includes the inclined reflective surface.

9. The display panel according to claim 7, wherein the included angle between the inclined reflective surface and the surface of the second base facing the first base is in a range from 27° to 37°.

10. The display panel according to claim 9, wherein in a thickness direction of the second base, a distance between an end of the inclined reflective surface proximate to the second base and an end of the inclined reflective surface away from the second base is in a range from 4.5 μm to 10.5 μm.

11. The display panel according to claim 1, wherein the light absorbing structure includes a black matrix and/or a black spacer.

12. The display panel according to claim 11, wherein the light absorbing structure includes the black matrix and the black spacer, the black spacer is located on a side of the black matrix away from the second base, and is in direct contact with the black matrix; and a distance between an edge of the light reflecting structure proximate to the black spacer and an edge of the black spacer proximate to the light reflecting structure in a direction from the light incident surface pointing to a second side opposite to the light incident surface is greater than a distance between the edge of the light reflecting structure proximate to the black spacer and an edge of the black matrix proximate to the light reflecting structure in the direction from the light incident surface pointing to the second side opposite to the light incident surface.

13. The display panel according to claim 11, wherein the light absorbing structure includes the black spacer, the first substrate further includes an opposite black spacer disposed at a side of the light conversion portion away from the first base, and an orthographic projection of the opposite black spacer on the first side of the first base is at least partially overlapped with an orthographic projection of the black spacer on the first side of the first base.

14. The display panel according to claim 1, wherein the first substrate further includes a first orientation layer disposed at a side of both the light extraction portion and the light conversion portion proximate to the second substrate;

the second substrate further includes a second orientation layer disposed on a side of both the light reflecting structure and the light absorbing structure proximate to the first substrate; and orientation directions of the first orientation layer and the second orientation layer are the same.

15. The display panel according to claim 1, further comprising a polarizer disposed on the light incident surface; wherein the first substrate further includes a first orientation layer disposed at a side of both the light extraction portion and the light conversion portion proximate to the second substrate;

the second substrate further includes a second orientation layer disposed on a side of both the light reflecting structure and the light absorbing structure proximate to the first substrate; and an extending direction of a transmission axis of the polarizer, an orientation direction of the first orientation layer and an orientation direction of the second orientation layer are the same.

16. The display panel according to claim 1, further comprising a reflective sheet disposed on a second side opposite to the light incident surface in the plurality of second sides, wherein the sub-pixel region includes a first sub-pixel sub-region and a second sub-pixel sub-region that is located on a side of the first sub-pixel sub-region and is adjacent to the first sub-pixel sub-region; the first sub-pixel sub-region and the second sub-pixel sub-region are arranged in a direction of the light incident surface pointing to the reflective sheet;

each of the first sub-pixel sub-region and the second sub-pixel sub-region is provided with a light reflecting structure and a light absorbing structure; and the light reflecting structure in the first sub-pixel sub-region and the light reflecting structure in the second sub-pixel sub-region are symmetrical with respect to a joint line of the first sub-pixel sub-region and the second sub-pixel sub-region; the light absorbing structure in the first sub-pixel sub-region and the light absorbing structure in the second sub-pixel sub-region are symmetrical with respect to the joint line of the first sub-pixel sub-region and the second sub-pixel sub-region.

17. The display panel according to claim 16, wherein the first substrate further includes a buffer layer disposed at a side of both the light extraction portion and the light conversion portion away from the first base; and a thickness of the buffer layer is h, $$h \geq \frac{d}{2} \times \cot\theta;$$

d is a dimension of the light extraction portion in a direction of the light incident surface pointing to the reflective sheet, and θ is an included angle between light exiting from the light extraction portion and a normal line perpendicular to the first base.

18. The display panel according to claim 1, wherein the first substrate further includes a common electrode disposed on a side of both the light extraction portion and the light conversion portion away from the first base;
the second substrate further includes a pixel electrode disposed at a side of both the light reflecting structure and the light absorbing structure proximate to the second base and located in the sub-pixel region; and
the pixel electrode includes a plurality of strip-shaped sub-electrodes spaced apart from one another.

19. A display device, comprising:
the display panel according to claim 1; and
a backlight, wherein the backlight is disposed at a side of the light incident surface in the display panel; the backlight is configured to emit collimated light, and to make the collimated light enter the first base of the display panel to propagate in the first base in a total reflection manner;
an incident angle of the collimated light is δ, $$\delta \geq \arcsin\frac{n'}{n};$$

n is a refractive index of the first base, and n' is a refractive index of the portion of the light conversion portion of the display panel in direct contact with the first base; and
the collimated light includes collimated natural light, and the display panel further include a polarizer disposed on the light incident surface.

20. A method of driving a display device, applied to the display device according to claim 19, the method comprising:
driving the backlight in the display device to emit the collimated light;
applying a common voltage to the first substrate of the display panel in the display device; and
applying a driving voltage to the second substrate of the display panel for each sub-pixel region in the display panel, so as to control a deflection angle of liquid crystal molecules in the sub-pixel region in the liquid crystal layer of the display panel, wherein
according to a current gray scale state of the sub-pixel region, when the sub-pixel region is in a dark state, a value of the driving voltage is adjusted to control the deflection angle of the liquid crystal molecules, so that collimated light exiting from the light extraction portion of the display panel is incident onto the light absorbing structure of the display panel;
when the sub-pixel region is in a bright state, the value of the driving voltage is adjusted to control the deflection angle of the liquid crystal molecules, so that the collimated light exiting from the light extraction portion is incident onto the light reflecting structure of the display panel; and
when the gray scale state of the sub-pixel region is between the dark state and the bright state, the value of the driving voltage is adjusted to control the deflection angle of the liquid crystal molecules, so that one part of the collimated light exiting from the light extraction portion is incident onto the light reflecting structure, and another part of the collimated light is incident onto the light absorbing structure.

* * * * *